(12) United States Patent
Cypher

(10) Patent No.: US 6,477,682 B2
(45) Date of Patent: Nov. 5, 2002

(54) TECHNIQUE FOR PARTITIONING DATA TO CORRECT MEMORY PART FAILURES

(75) Inventor: Robert Cypher, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/854,352

(22) Filed: May 10, 2001

(65) Prior Publication Data

US 2002/0010889 A1 Jan. 24, 2002

Related U.S. Application Data

(63) Continuation of application No. 09/160,770, filed on Sep. 24, 1998, now Pat. No. 6,233,716.

(51) Int. Cl.[7] .................................................. G11C 29/00
(52) U.S. Cl. ........................................ 714/805; 714/777
(58) Field of Search ................................. 714/763, 773, 714/758, 766, 805, 777, 761, 799, 5, 767

(56) References Cited

U.S. PATENT DOCUMENTS

| 3,665,395 | A |   | 5/1972  | Bockmann         |
|-----------|---|---|---------|------------------|
| 4,107,650 | A |   | 8/1978  | Luke et al.      |
| RE30,187  | E |   | 1/1980  | Hong et al.      |
| 4,334,309 | A |   | 6/1982  | Bannon et al.    |
| 4,862,462 | A |   | 8/1989  | Zulian           |
| 4,995,041 | A |   | 2/1991  | Hetherington et al. |
| 5,291,498 | A |   | 3/1994  | Jackson et al.   |
| 5,537,423 | A | * | 7/1996  | Chen ........................... 714/761 |
| 5,546,411 | A |   | 8/1996  | Leitch et al.    |
| 5,784,391 | A | * | 7/1998  | Konigsburg ................. 714/773 |
| 6,141,789 | A |   | 10/2000 | Cypher           |
| 6,233,716 | B1 | * | 5/2001 | Cypher ........................ 714/777 |
| 6,282,686 | B1 | * | 8/2001 | Cypher ........................ 714/758 |

OTHER PUBLICATIONS

Dell, "A white Paper on the Benefits of Chipkill—Correct ECC for PC Server Main Memory," IBM Microelectronics Division, Nov. 1997, pp. 1–23.
"Parallel Parity," 1994, 1 pg.
"Modulo–2 Arithmetic," 1994, 1 pg.
"Introduction to Error Control," 1994, 1 pg.

(List continued on next page.)

Primary Examiner—Albert Decady
Assistant Examiner—Guy Lamarre
(74) Attorney, Agent, or Firm—B. Noël Kivlin

(57) ABSTRACT

The bits of a data block are assigned to a plurality of logical groups such that at most one bit corresponding to a component is assigned to a logical group. This assignment ensures that a component failure may introduce at most one bit error to a logical group. A number of bits in a logical group is selected to reduce the number of check bits for a given number of data bits. Error correction may be performed within each logical group to correct single errors within the logical group. Because each logical group is assigned at most one bit corresponding to a component, component failures may be detected and corrected.

30 Claims, 9 Drawing Sheets

OTHER PUBLICATIONS

Barker et al., "ASCII Table," 1998, 1 pg.
"Parity & Computing Parity," 1994, 2 pgs.
"Error Correction with Hamming Codes," 1994, 2 pgs.
Barker et al., "Hamming Code, Background Information," Feb. 1998, 3 pgs.
Barker et al., "Hamming Code Theory," Mar. 1998, 2 pgs.
"NUMA: Delivering the Next Level of Commodity SMP Performance," 1996, 3 pgs.
Barker et al., "General Definitions," Feb. 1998, 3 pgs.
Barker et al., "Hamming Code Lab Procedure," Jun. 1998, 3 pgs.
NN9405101 (Single–Bit Correct, Double–Bit Detect Error Checking/Correction Scheme; IBM Technical Disclosure Bulletin, May 1994, US; vol. No. 37, Issue No. 5, page No. 101–104).*
NN7206130(Single Error Correction, Double Error Detection Code Utilizing Minimum Circuitry; IBM Technical Disclosure Bulletin, Jun. 1972, US; vol. No. 15, Issue No. 1, p. No. 130–134).*
NN6509569(Linear Recoverable Superimposed Codes; IBM Technical Disclosure Bulletin, Sep. 1965, US; vol. No. 8, Issue No. 4, p. No. 569–576).*

* cited by examiner

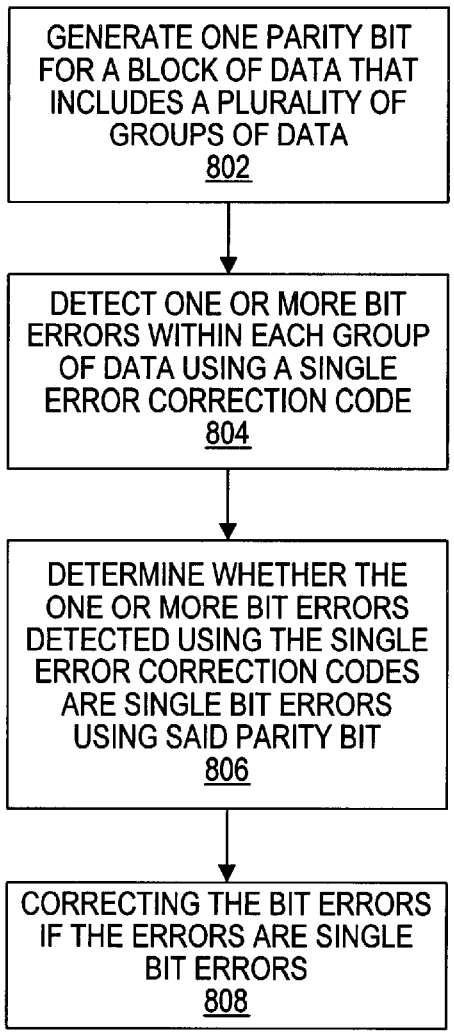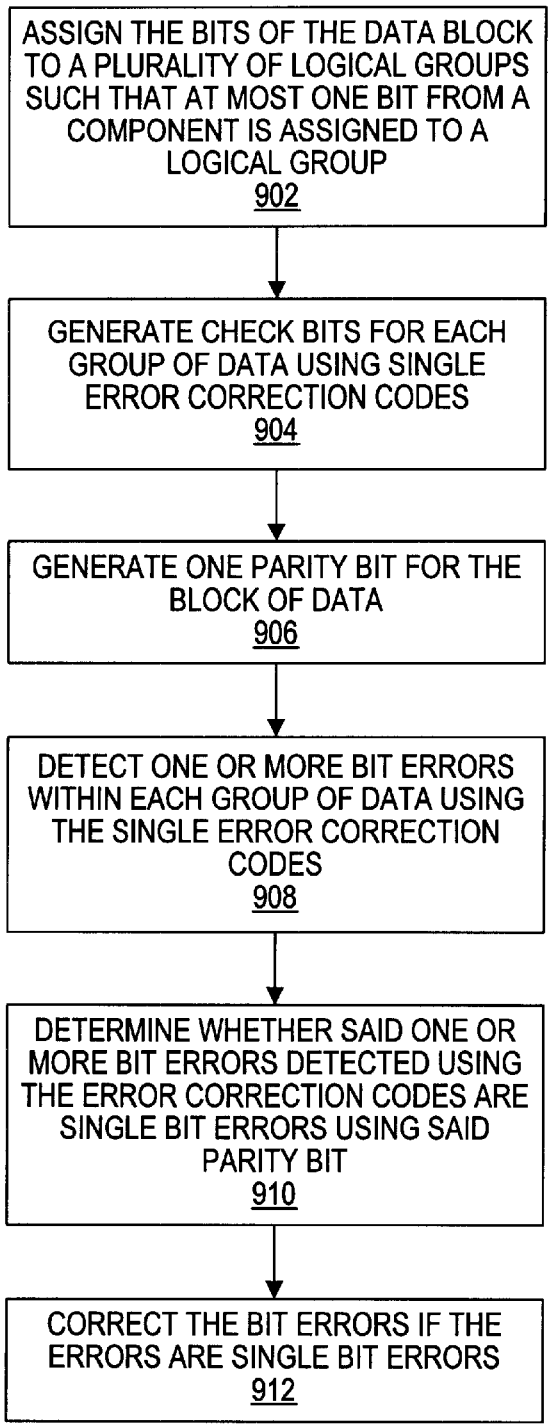
FIG. 8
FIG. 9

TECHNIQUE FOR PARTITIONING DATA TO CORRECT MEMORY PART FAILURES

This application is a continuation application of U.S. patent application Ser. No. 09/160,770, filed Sep. 24, 1998 now U.S. Pat. No. 6,233,716.

BACKGROUND OF THE INVENTION

1. Field of the Invention

This invention relates to error detection and correction and, more particularly, to error codes that detect and correct bit errors in computer memory systems.

2. Description of the Relevant Art

Error codes are commonly used in computer systems to detect and/or correct data errors, such as transmission errors or storage errors. For example, error codes may be used to detect and correct errors of data transmitted via a telephone line, a radio transmitter or a compact disk laser. Another common use of error codes is to detect and correct errors within data that are stored and read from a memory of a computer system. For example, error correction bits, or check bits, may be generated for data prior to storing data to one or more memory devices. When the data are read from the memory device, the check bits may be used to detect or correct errors within the data. Errors may be introduced either due to faulty components or noise within the computer system. Faulty components may include faulty memory devices or faulty data paths between devices within the computer system, such as faulty pins.

Hamming codes are one commonly used error code. The check bits in a Hamming code are parity bits for portions of the data bits. Each check bit provides the parity for a unique subset of the data bits. If an error occurs, i.e. one or more bits change state, one or more syndrome bits will be asserted (assuming the error is within the class of errors covered by the code). Generally speaking, syndrome bits are generated by regenerating the check bits and comparing the regenerated check bits to the original check bits. If the regenerated check bits differ from the original check bits, an error has occurred and one or more syndrome bits will be asserted. Which syndrome bits are asserted may also be used to determine which data bit changes state, and enable the correction of the error. For example, if one data bit changes state, this data bit will modify one or more check bits. Because each data bit contributes to a unique group of check bits, the check bits that are modified will identify the data bit that changed state. The error may be corrected by inverting the bit identified to be erroneous.

One common use of Hamming codes is to correct single bit errors within a group of data. Generally speaking, the number of check bits must be large enough such that $2^{k-1}$ is greater than or equal to n, where k is the number of check bits and n is the number of data bits plus the number of check bits. Accordingly, seven check bits are required to implement a single error correcting Hamming code for 64 data bits. A single error correcting Hamming code is able to detect and correct a single error. The error detection capability of the code may be increased by adding an additional check bit. The use of an additional check bit allows the Hamming code to detect double bit errors and correct single bit errors. The addition of a bit to increase the data detection capabilities of a Hamming code is referred to as an extended Hamming code. Extended Hamming codes are discussed in more detail below.

Component failures are one problem that arises in computer memory systems. A component failure may introduce multiple errors that are uncorrectable by the error code. For example, if eight bits of a block of data are stored in the same memory device, the failure of the memory device may introduce eight bit errors into that block of data. Accordingly, one component failure may introduce a sufficient number of errors that the error correction code is not able to detect or correct the error. Likewise, a data path failure between a memory component and error correction circuitry, such as a pin failure, may introduce multiple errors into a block of data for which the error correction code is used.

One potential solution to prevent a component error from introducing multiple errors into a group of data is to store the data such that only one bit of data within the group is affected by any one component. For example, in a group of data with 64 data bits and 7 check bits, each bit of data may be stored in a different memory device. In this embodiment, 71 memory chips are required. Each memory device would store one bit of the 71-bit data group. Unfortunately, allocating bits to a group of data based on the number of data bits and check bits may not optimize the use of check bits within the system.

It is a common design goal of computer systems to reduce the number of check bits used to detect and correct errors. The check bits increase the amount of data handled by the system, which increases the number of memory components, data traces and other circuitry. Further, the increased number of bits increases the probability of an error. Although the check bits may make an error detectable and/or correctable, increasing the number of data bits within the system increases the probability of an error occurring. For at least these reasons, it is desirable to decrease the number of check bits for a given level of error detection and/or correction. It is further desired to increase the error correcting capability of a single error correcting code with a minimal number of additional bits.

SUMMARY OF THE INVENTION

The problems outlined above are in large part solved by a technique for partitioning data to correct memory part failures in accordance with the present invention. The data bits are assigned to a plurality of logical groups such that at most one bit corresponding to a component is assigned to a logical group. A bit may correspond to more than one component. For example, a bit may be stored in a memory device and may be transferred on a data pin. Accordingly, this bit corresponds to the memory device in which it is stored and the pin on which it is transferred. The assignment of at most one bit per component insures that a component failure may introduce at most one bit error to a logical group.

Unlike traditional systems in which a number of bits in a logical group is determined solely by the number of different components, logical groups in the present invention are selected to reduce the number of check bits for a given number of data bits. For example, the use of 57 data bits and 6 check bits is an optimal implementation of a single error correcting Hamming code. Accordingly, the logical groups may be assigned 63 bits each. In this manner, the number of check bits to detect and correct errors may be reduced. Error correction may be performed within each logical group to correct single errors within the logical group. As discussed above, because each logical group is assigned at most one bit corresponding to each component, component failures may be detected and corrected.

Broadly speaking, the present invention contemplates a method of detecting errors in a data block of a computer system that includes a plurality of components, the method comprises: assigning the bits of the data block to a plurality of logical groups such that at most one bit corresponding to a component is assigned to a logical group; performing error detection on the logical groups, wherein the logical group includes data bits and check bits; wherein a size of a logical group is selected to decrease a number of check bits in the data block.

The present invention further comprises a method of detecting errors in a data block of a computer system that includes a plurality of first components and a plurality of second components wherein bits of the data block are assigned to a first component and a second component, the method comprises: assigning the bits to a plurality of logical groups such that at most one bit from a first component is assigned to a first logical group and at most one bit from a second component is assigned to the first logical group; performing error detection on the first logical group, wherein the first logical group includes data bits and check bits; wherein a size of a first logical group is selected to decrease a number of check bits in the data block.

The present invention still further contemplates a system memory including a plurality of memory devices configured to store a data block, a plurality of pins configured to transfer bits of the data block and an error detection circuit coupled to the memory devices and the pins. Each bit of the data block is assigned to one of the plurality of memory devices and one of the pluralities of pins. The error detection circuit is configured to generate check bits for data stored in the plurality of memory devices and transferred by the plurality of pins, wherein the check bits are stored in the plurality of memory devices and transferred by the plurality of pins. The error detection circuit generates the check bits for a logical group of data prior to transferring and storing the data, and verifies the check bits for the logical group after storage and transfer. A logical group includes at most one bit assigned to a memory device and at most one bit assigned to a pin, wherein a size of a logical group is selected to optimize a number of check bits to a number of data bits.

The present invention still further contemplates a computer system including a processor, a bus, and a memory system. The memory system includes a plurality of memory devices configured to store a data block, a plurality of pins configured to transfer bits of the data block and an error detection circuit coupled to the memory devices and the pins. Each bit of the data block is assigned to one of the plurality of memory devices and one of the plurality of pins. The error detection circuit is configured to generate check bits for data stored in the plurality of memory devices and transferred by the plurality of pins, wherein the check bits are stored in the plurality of memory devices and transferred by the plurality of pins. The error detection circuit generates the check bits for a logical group of data prior to transferring and storing the data, and verifies the check bits for the logical group after storage and transfer. A logical group includes at most one bit assigned to a memory device and at most one bit assigned to a pin, wherein a size of a logical group is selected to optimize a number of check bits to a number of data bits.

BRIEF DESCRIPTION OF THE DRAWINGS

Other objects and advantages of the invention will become apparent upon reading the following detailed description and upon reference to the accompanying drawings in which:

FIG. 8 is a flowchart diagram of a method of extending the error detection capability of an error correction code according to one embodiment of the present invention;

FIG. 9 is a flowchart diagram of a method of partitioning data bits into a plurality of logical groups in which the error detection capability of an error correction code is increased according to one embodiment of the present invention;

Figure 1:
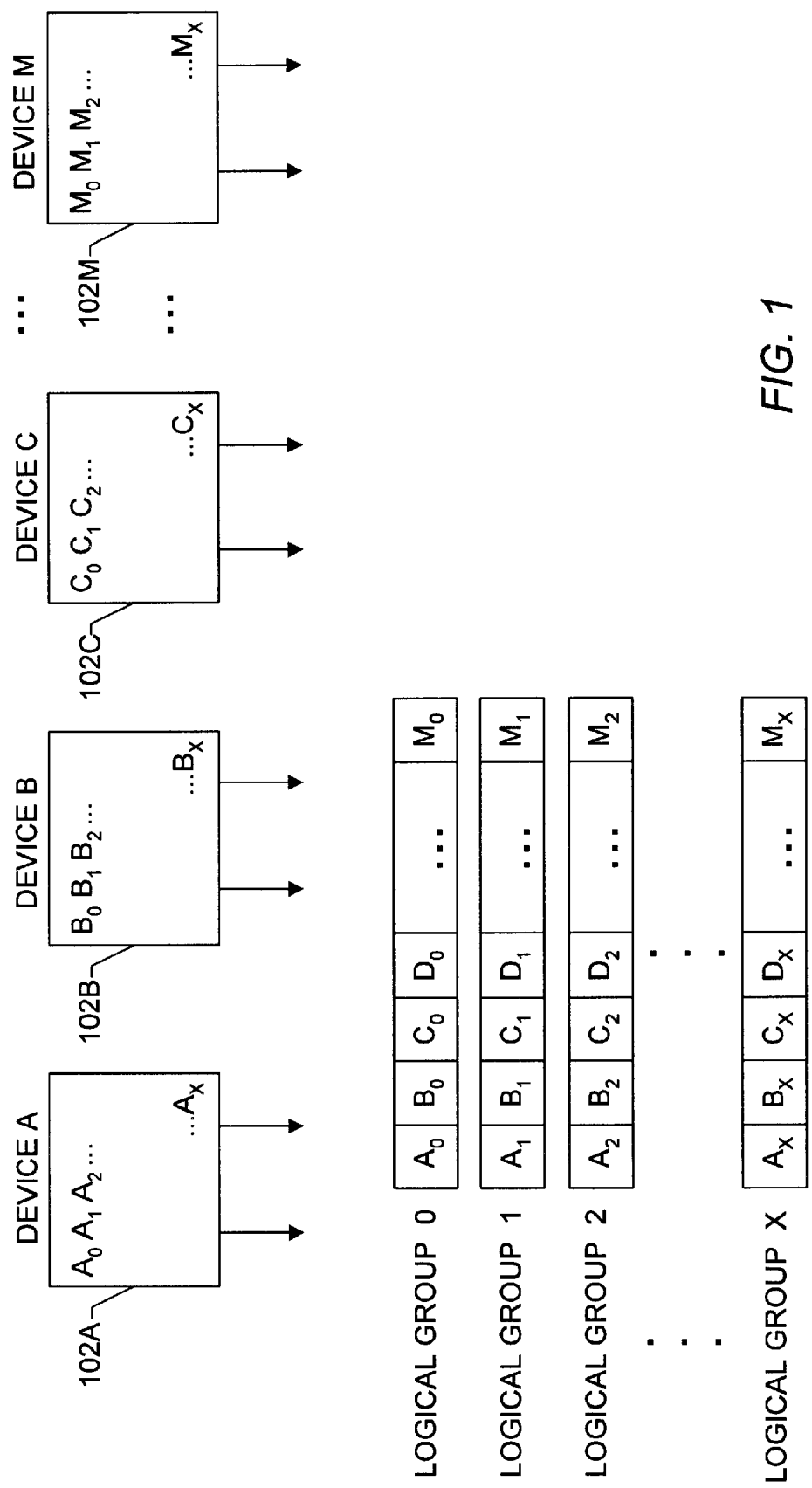
FIG. 1 is a diagram that illustrates the allocation of bits of a data block to logical groups.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, the allocation of bits of a data block to a plurality of logical groups is shown. In the illustrated embodiment, a memory system includes memory devices labeled 102A–102M. It is noted that the number of memory devices may be a variable that may represent any number. Elements referred to herein with a particular reference numeral followed by a letter may be collectively referred to by the reference number alone. For example, memory devices 102A–102M may be collectively referred to as memory devices 102. Each memory device stores a plurality of bits of a data block. For example, memory device 102A stores bits A0–AX, device 102B stores data bits B0–BX, etc. It is noted that the bits of a data block may be data bits or check bits. The bits stored in a particular memory device are referred to as "corresponding" to that device. Likewise, the bits transferred to a particular pin "correspond" to that pin. Generally speaking, a bit may correspond to one or more components in a computer system. Generally speaking, components are devices and other parts of a computer system. For example, components may be memory devices, pins, data paths, connections, etc.

The bits within the memory system are allocated to a plurality of logical groups. Each logical group stores data bits and check bits. The number of check bits is determined by the number of data bits within a logical group and the desired level of error detection and/or correction capability. The check bits are generated prior to storing data to memory devices 102. After the data are read from memory devices 102, the check bits are used to determine whether the state of any of the data bits changed. The detection of the changed state of a data bit is referred to as error detection. Some codes provide the ability not only to detect an error, but also to identify which data bit is erroneous. If the erroneous data bit is identified, the error may be corrected by inverting the erroneous data bit. A commonly used code is a single error correcting (SEC) Hamming code. This code allows, any one bit error within a logical group to be detected and corrected. In an embodiment which implements a single error correcting Hamming code, multiple bit errors may go undetected. Accordingly, it is desirable to limit the number of bit errors per group.

To prevent one component failure from contributing multiple bit errors to a logical group, the bits are allocated to logical groups in a manner such that only one bit corresponding to a component is allocated to a logical group. For example, only one bit stored in memory device 102A is allocated to a logical group and only one bit transferred on a particular pin is allocated to the same logical group.

In the illustrated embodiment, logical group zero includes data bits A0, B0, C0, D0 ... M0. In other words, the first data bit of each memory device 102 is allocated to logical group zero. Likewise, the second data bit from each memory device 102 is allocated to logical group one, etc. In this manner, a memory device failure can contribute at most one error to each logical group. For example, if each data bit of a memory device 102A is erroneous, the first data bit in each logical group is erroneous. Assuming no other errors exist within the system, the check bits may be used to detect and/or correct the bit failure in each logical group. In the illustrated embodiment, the number of bits per logical group is dictated by the number of memory devices. Furthermore, the number of memory devices is dictated by the number of data bits and check bits, and the number of logical groups is dictated by the number of bits of a data block stored by a memory device. For example, if 64 data bits are included in a logical group, seven check bits are required for single error correction capability. Accordingly, the memory system implements 71 memory devices and each logical group includes 71 bits. In one embodiment, a data block includes 512 data bits allocated to eight logical groups of 64 data bits and seven check bits each. With seven check bits per logical group, this configuration requires a total of 56 check bits.

Figure 2:
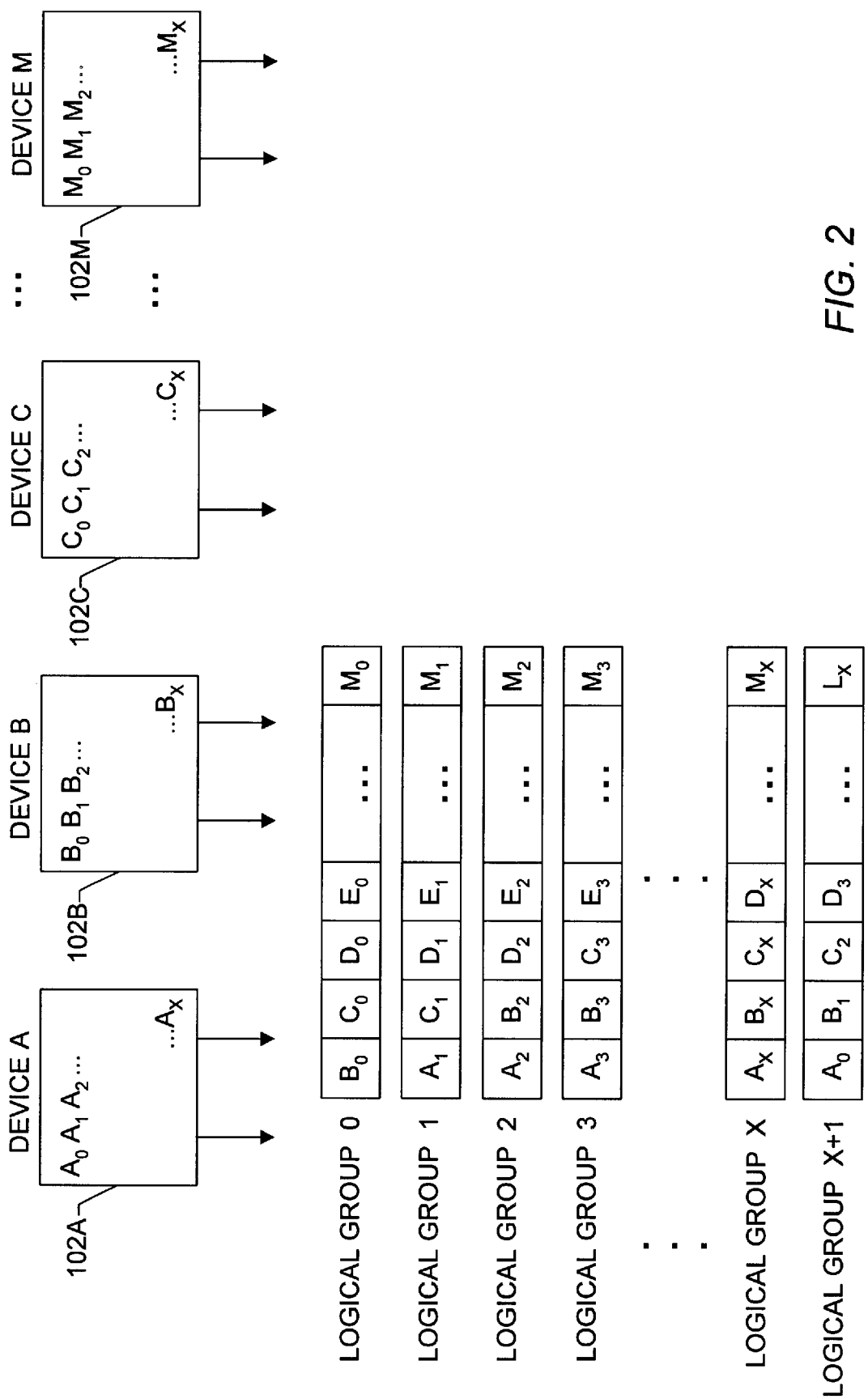
FIG. 2 is a diagram that illustrates an optimized allocation of bits of a data block to logical groups according to one embodiment of the present invention.

Turning now to FIG. 2, an optimized allocation of bits to logical groups according to one embodiment of the present invention is shown. Components that are identical or substantially similar to those in FIG. 1 are given the same reference numerals for simplicity. In the illustrated embodiment, the bits of a block of data are stored in a plurality of memory devices 102A–102M. The bits are also assigned to logical groups such that at most one bit corresponding to a component is assigned to any one logical group. As discussed above, by limiting the number of bits from a component in each logical group, a single error correction code may be used to correct errors caused by faulty components.

In the illustrated embodiment, the number of bits per logical group and the number of logical groups is not dictated by the number of memory devices. In contrast, the number of bits per logical group is selected to reduce the number of check bits. In one particular embodiment, the number of bits per logical group is selected to optimize the number of check bits to data bits. In the illustrated embodiment, the number of logical groups is increased to reduce the number of data bits per logical group. In the illustrated embodiment, the number of logical groups is increased from X+1 to X+2. It is noted that this configuration is for illustrative purposes only and other configurations that reduce the number of check bits are contemplated. In the illustrated embodiment, logical group 0 includes bits from memory devices 102B–102M. Logical group 1 includes bits from memory devices 102A, 102C–102M. Logical group 2 includes bits from memory device 102A, 102B and 102D–102M. Logical group X includes bits from logical devices 102A–102K and 102M. Logical group X+1 includes bits from logical devices 102A–102L.

The number of bits per logical group is reduced to optimize the number of data bits to check bits. Assume a 512 bit data block is assigned to logical groups. The bits may be allocated such that eight logical groups have 57 data bits each, and a ninth logical group has 56 data bits. A single error correcting Hamming code requires 6 check bits for 57 data bits or less. Accordingly, a total of 54 check bits (9 groups of 6 check bits each) are required for the data block. In contrast, the allocation of bits in FIG. 1 requires 56 check bits (8 groups of 7 check bits each). Accordingly, the optimized partitioning illustrated by FIG. 2 reduces the number of check bits by 2. It is again noted, that the above example is for illustrative purposes only. Other embodiments in which data bits of components are allocated to logical groups to reduce the number of check bits are contemplated.

Figure 3:
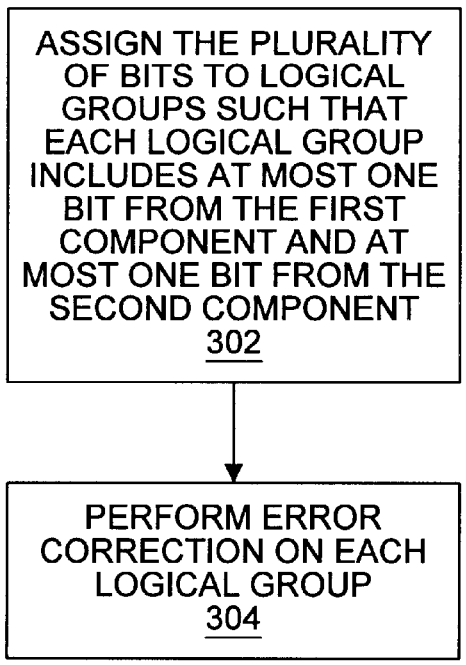
FIG. 3 is a flowchart diagram of a method of partitioning data bits to correct component failures according to one embodiment of the present invention.

Turning now to FIG. 3, a flowchart diagram of a method of partitioning data bits into a plurality of logical groups to correct component failures according to one embodiment of the present invention is shown. In step 302, a plurality of data and check bits of a data block are assigned to logical groups such that each logical group includes at most one bit corresponding to a component. In this manner, a component failure can introduce at most one bit error into a logical group. The number of data bits assigned to a logical group is selected to maximize the number of data bits to check bits. In step 304, error correction is performed on each logical group. Step 304 is discussed in more detail below in reference to FIG. 4.

Figure 4:
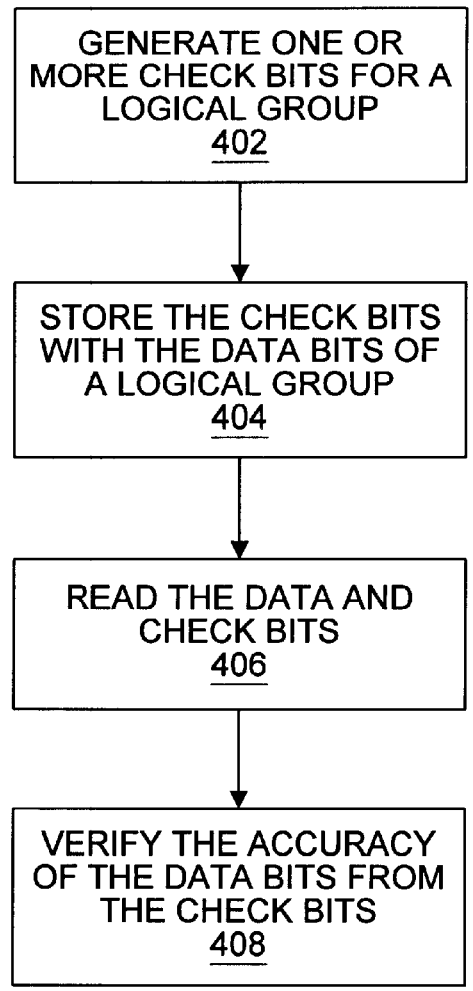
FIG. 4 is a flowchart diagram of a method of performing error detection on a logical group according to one embodiment of the present invention.

Turning now to FIG. 4, a flowchart diagram of a method of performing error correction on a group of data bits according to one embodiment of the present invention is shown. In step 402, one or more check bits are generated for a logical group. Generally speaking, a logical group is a collection of data bits for which error detection or correction is desired and the check bits for those data bits. In step 404, the check bits and the data bits of a logical group are stored to a memory device. In step 406, the data and check bits are read from the storage device. In step 408, the accuracy of the data bits is verified from the check bits. In one embodiment, verifying the accuracy of the data bits includes regenerating the check bits. If the state of the regenerated check bits is the same as the stored check bits, no errors within the class of errors covered by the code have occurred. In other words, if the error code has the capability of detecting two errors in each logical group, then if the regenerated check bits are the same as the stored check bits, either no errors have occurred or more than two errors have occurred. In one particular embodiment, the error code is a Hamming code. In this embodiment, verifying the accuracy of the data bits involves generating a syndrome bit for each check bit. Generally speaking, a syndrome bit is the parity of the data bits used to generate a check bit and the check bit itself. In one embodiment, employing even parity, the check bit has not changed states if the corresponding syndrome bit is unasserted. In one particular embodiment, if one or more syndrome bits are asserted, the syndrome bits that are asserted may be used to detect which data bit is erroneous. Erroneous data bits may be corrected by inversion.

Figure 5:
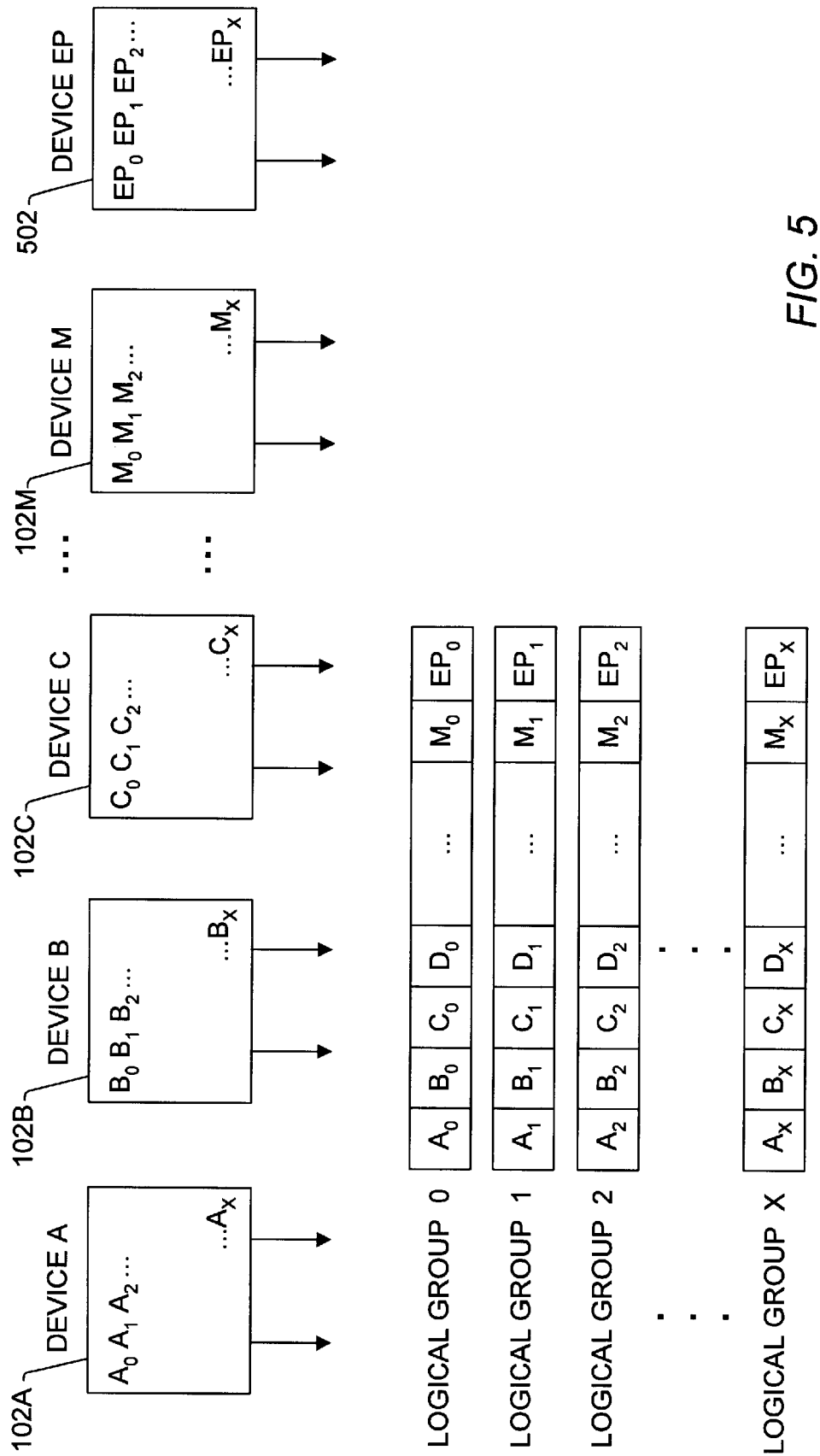
FIG. 5 is a diagram that illustrates the allocation of bits of a data block to logical groups that implement an extended Hamming code according to one embodiment of the present invention.

Turning now to FIG. 5, a diagram illustrating the allocating of bits of a data block to logical groups with single error correction and double error detection capabilities according to one embodiment of the present invention is shown. In the illustrated embodiment, an additional check bit is added to each logical group. The additional check bit extends the capability of a single error correction code to detect double bit errors within a logical group. An additional memory device 502 is added to store the additional check bit.

Generally speaking, in a single error correction code, such as a Hamming code, multiple bit errors may cause one or more syndromes to be non-zero. However, multiple bit errors may erroneously appear as a single bit error in a different bit position. For example, in a single error correcting Hamming code with six check bits, one bit error may cause two check bits to change states. Another bit error may cause two other check bits to change state. Accordingly, if these two errors occur within a logical group, four check bits will change state. Unfortunately, a one-bit error in still another bit position may cause those same four check bits to change state. The error correction procedure may assume the bit that affects all four check bits changed state and invert the data bit. If the check bit changes were actually caused by two bit errors, the error correction procedure has inverted a non-erroneous bit. Accordingly, the error correction procedure has created more errors and may erroneously indicate that the data is error free.

The addition of an extended parity bit resolves this problem. When the data are read from memory, the check bits and extended parity bit are regenerated and compared to the original check bits and extended parity bit. If the regenerated check bits are different than the original check bits, the extended parity bit may be used to determine whether one or two bit errors occurred. If one error occurs, the regenerated extended parity bit will differ from the original extended parity bit If two errors occur, the regenerated extended parity bit will be the same as the original extended parity bit. If one or more check bits change state and the regenerated extended parity bit is different, a single bit error has occurred and is corrected. Alternatively, if one or more check bits change state and the extended parity bit is the same, two bit errors are detected and no correction is performed. In the latter case, an uncorrectable error may be reported to a memory controller or other component within the computer system. It is noted, that more than two bit errors in a logical group is not within the class of errors addressed by the error correcting code. Accordingly, three or more errors may go undetected or the error correcting code may interpret the errors as a single bit error and invert a data bit that was not erroneous.

Figure 6:
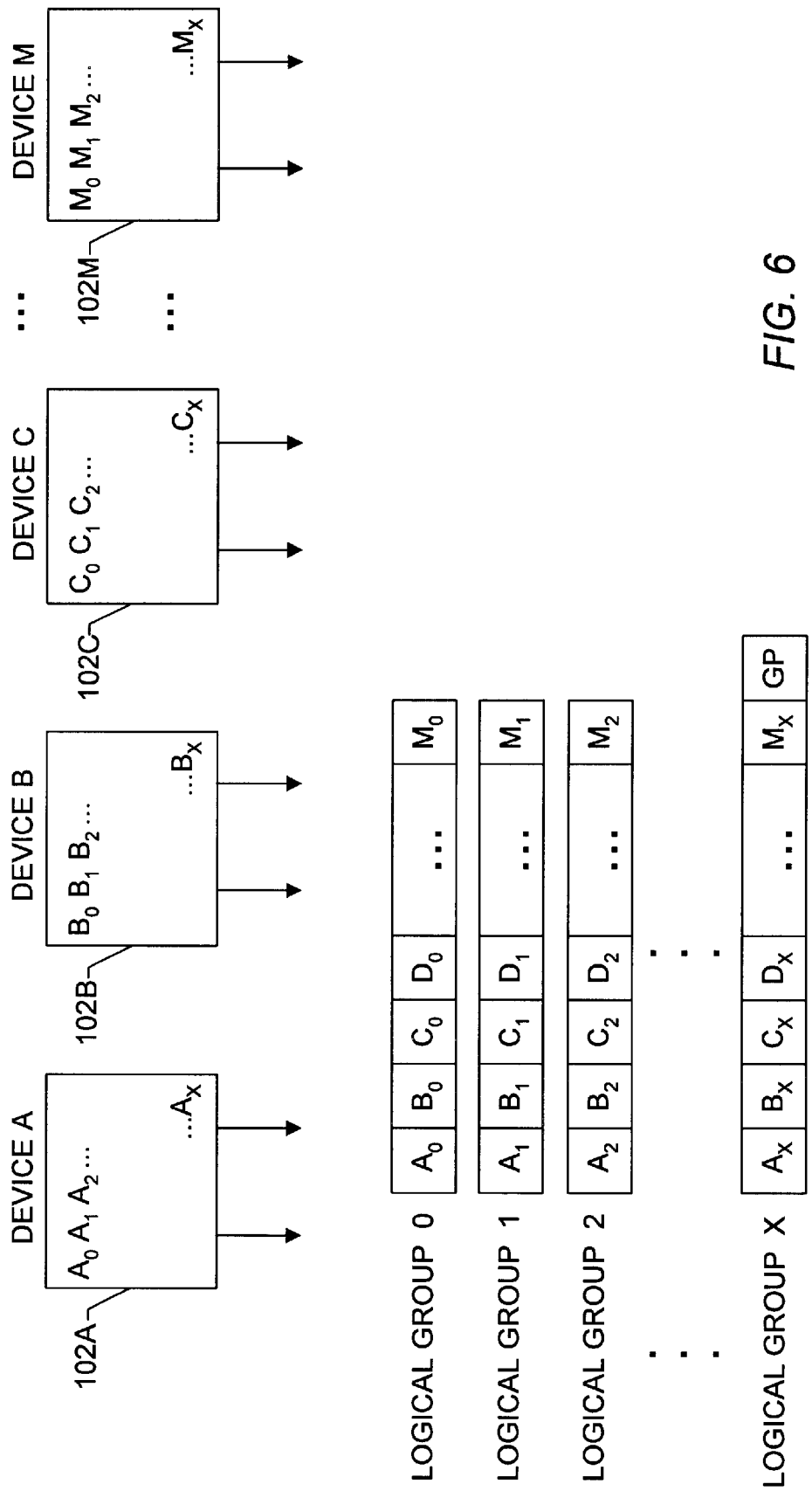
FIG. 6 is a diagram that illustrates the allocation of bits of a data block to logical groups that share a parity bit according to one embodiment of the present invention.

Turning now to FIG. 6, an improved method of extending the error detection capability of a single error correction code according to one embodiment of the present invention is shown. In the illustrated embodiment, the extended parity bits of each logical group are replaced by one global parity bit, or global check bit, thereby eliminating X−1 bits (where X is the number of logical groups). The global parity bit may be stored in a special memory location or in one of the memory devices, such as in memory device 102A. Generally speaking, the groups share the parity bit for extending the error detection capability of the single error correcting code of the groups. In the illustrated embodiment, the global parity bit is an even parity bit and covers logical group zero through logical group X. Prior to storing data to the memory devices, check bits are generated for each logical group and the global parity bit is generated for all the logical groups including the check bits. The generation of the global parity bit is discussed in more detail below in reference to FIG. 10. It is noted that a circular condition must be addressed. Namely, the check bits within the logical group that includes the global parity bit depend upon the state of the global parity bit. Likewise, the global parity bit depends upon the state of the check bits.

Upon reading the data and check bits from the memory devices, the syndrome for each logical group is generated and a global syndrome (Q) is generated. In one embodiment, a syndrome includes a plurality of syndrome bits. A non-zero syndrome (i.e., one or more syndrome bits are asserted) indicates a bit error. A zero syndrome (i.e., all syndrome bits are unasserted) indicates no bit errors. Q is the overall parity of all the logical groups including the global parity bit. If Q is even (i.e., a logical 0) then an even number of errors have occurred. It is noted that zero errors are an even number of errors. It is further noted that two or less arbitrary bit and single memory device failures errors are the class of errors covered by the code. Accordingly, errors of three or more bits, not all from the same memory device, are not considered in the discussion below. If Q is even and all the syndromes are zero, then no errors have occurred and the data is accepted without correction. If Q is even and an even number of syndromes are non-zero, then an even number of errors have occurred in separate logical groups. Accordingly, no logical group has more than one bit error. The non-zero syndromes are used to perform single error correction within the respective logical groups and the corrected data is provided to the computer system. If Q is even and an odd number of syndromes are non-zero, then more than one bit error has occurred within a logical group and an uncorrectable error is reported.

If Q is odd, then an odd number of errors within the data block has occurred. If Q is odd and an even number of syndromes are non-zero, more than one bit error has occurred within a logical group and an uncorrectable error is reported. If Q is odd and one syndrome is non-zero, one bit error has occurred. The syndrome is used to perform error correction on its corresponding logical group and the corrected data is provided to the system. If Q is odd and an odd number of syndromes are non-zero, an odd number of single bit errors have occurred in separate logical groups. Accordingly, no logical group has more than one bit error. The non-zero syndromes are used to perform single error corrections with the corresponding logical groups. Generally speaking, a single bit error in a logical group may be detected and corrected. In the above manner, the error detection capability of a single error correction code may be increased to detect two bit errors within a data block by adding a single bit to the data block.

Figure 7:
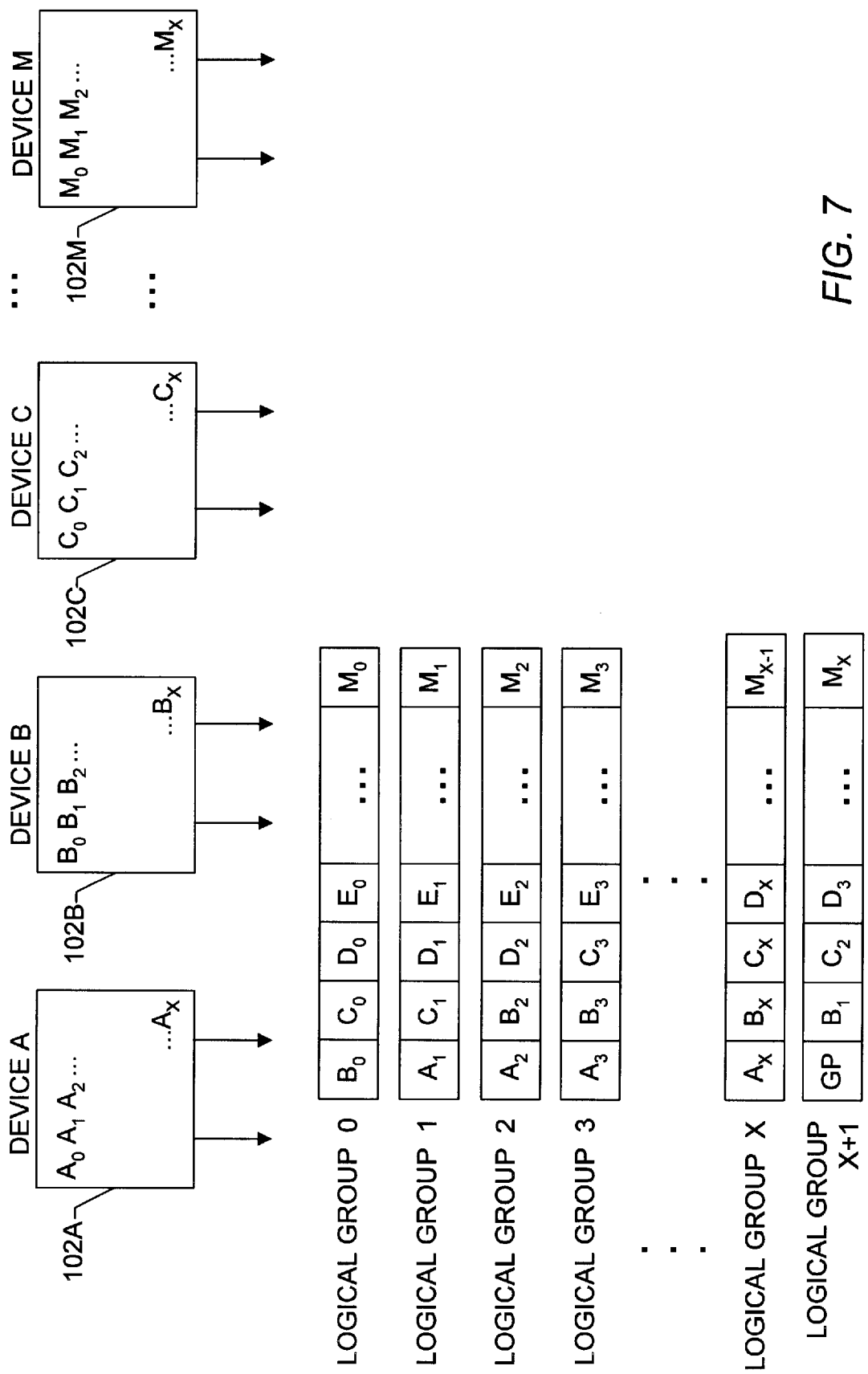
FIG. 7 is a diagram that illustrates an optimized allocation of bits of a data block to logical groups that share a parity bit according to one embodiment of the present invention.

Turning now to FIG. 7, an optimized partitioning of data bits to logical groups and an improved extension of the error detection capabilities of an error correcting code according to one embodiment of the present invention is shown In the illustrated embodiment, the error detection capabilities of the error correction code of the memory system illustrated in FIG. 2 is increased in a similar manner to that discussed above in reference to FIG. 6. The data and check bits are allocated to logical groups in a manner that optimizes the number of data bits to check bits. Further, the error detection capability of the error detection code of each logical group is extended by adding one global parity bit for the entire data block.

As discussed above in reference to FIG. 2, the number of check bits required for a data block of 512 data bits may be reduced by two bits by optimally allocating bits to logical groups. The number of check bits required for the block of data may be reduced from 56 to 54. Further, the number of check bits required to extend the error detection capability may be reduced from eight bits (one bit for each of the eight logical groups) to one bit in accordance with the technique discussed above in reference to FIG. 6. Accordingly, the illustrated embodiment provides single error correction and double error detection for a data block of 512 data bits with nine fewer check bits than typical implementations.

Turning now to FIG. 8, a flowchart diagram of a method for increasing the error detection capability of a single error correction code according to one embodiment of the present invention is shown. In step 802, one global parity bit for a block of data is generated. The block of data includes a plurality of logical groups of data. A single error correction code is applied to each logical group. The global parity bit is the parity for the entire block of data including the data bits and check bits of each logical group. In step 804, one or more bit errors within each logical group are detected using the single error correction code of that logical group. In step 806, is it determined whether one or more bit errors are detected using the parity bit. Based on the number of logical groups with bit errors and the number of bit errors detected by the global parity bit, it may be determined whether multiple bit errors occurred within a logical group. In step 808, if only single bit errors are detected in each logical group, the error correction codes for the logical groups in which errors were detected are used to correct the bit errors. Alternatively, if multiple bit errors were detected in a logical group, an uncorrectable error is reported to the system.

Turning now to FIG. 9, a flowchart diagram illustrating an optimized method of allocating bits to logical groups and increasing the error detection capability of those logical groups according to one embodiment of the present invention is shown. In step 902, the bits are assigned to logical groups such that at most one bit corresponding to a component is assigned to any logical group. In one embodiment, the number of bits in a logical group is selected to optimize the number of data bits to check bits. In step 904, check bits are generated for each logical group using a single error correction code. In step 906, a global parity bit is generated for the block of data In step 908, one or more bit errors within each logical group are detected using the single error correction codes of the logical groups. In step 910, the parity bit is used to determine whether the errors detected in each logical group represent more than one bit error within a logical group. In step 912, if only single bit errors within a logical group are detected, the single error correction codes are used to correct the bit errors and the corrected data is provided to the system. Alternatively, if multiple bit errors within a logical group are detected, an uncorrectable error signal may be provided to the system.

Figure 10:
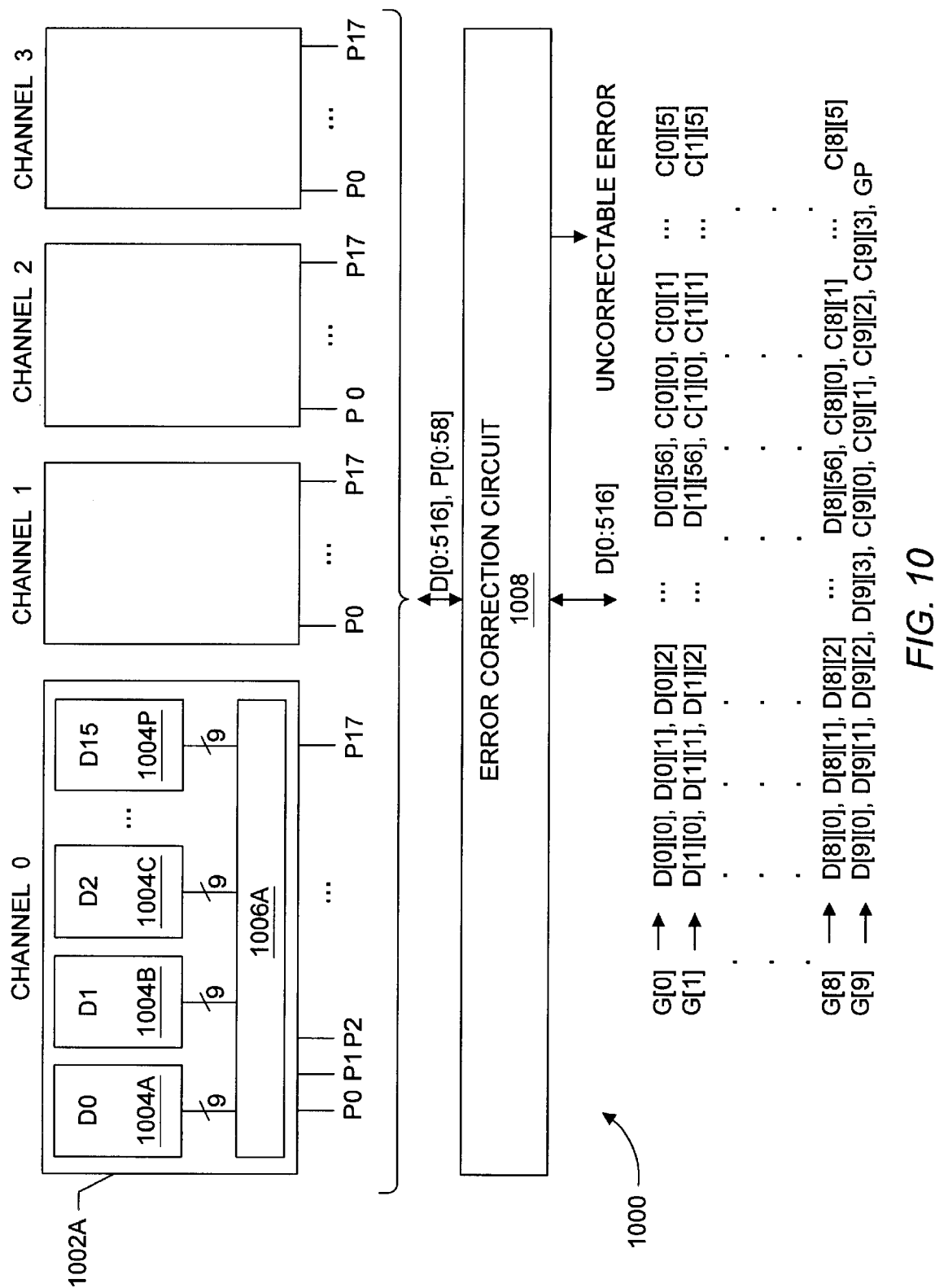
FIG. 10 is a block diagram of a computer memory system that allocates bits of a data block into a plurality of logical groups according to one specific implementation of the present invention.

Turning now to FIG. 10, a specific embodiment of a computer memory system that incorporates optimized partitioning of data bits to the logical groups and employs enhanced error detection capability according to one embodiment of the present invention is shown. Memory system 1000 includes four data channels 1002A–1002D. Each data channel includes a plurality of memory devices. For example, data channel 0 includes memory devices 1004A–1004P. Data is output from each channel on eighteen pins. For example, data channel 1002A outputs data on pins P0–P17. Data is output from the memory devices in 576 bit blocks. Accordingly, each data channel outputs 144 bits. Each memory device of a data channel outputs nine bits of data per read operation. The data is routed to the eighteen pins via a switching network. For example, in data channel 1002A, the outputs of the sixteen devices are coupled to the eighteen output pins (P0–P17) via switching network 1006A. The 576 bits are output in eight cycles of 72 bits a cycle. As will be discussed in more detail below, the 576 bits include 517 bits of data and 59 check bits. The 517 bits of data may be further broken down into 512 bits of actual data and five bits of meta-data.

The outputs of data channels 1002A–1002D are coupled to error correction circuit 1008. Error correction circuit 1008 is configured to generate and verify an error correction code that corrects all one bit errors and detects all two bit errors. The error correction code further corrects for any memory device failure.

To prevent a single component failure from causing multiple bit errors within a logical group, the bits are allocated to logical groups such that at most one bit corresponding to a component is assigned to a logical group. For example, when a bit is assigned to a logical group, no other bits stored in the same memory device are allocated to that group, and no other data bits that are transferred on the same pin are assigned to the logical group. In this manner, a component failure, such as a memory device failure or a pin failure, can introduce at most one bit error to a logical group.

The number of bits assigned to each logical group may be selected to optimize the number of data bits to check bits. In the illustrated embodiment, the data bits are assigned to 10 logical groups (G[0]–G[9]). Logical groups G[0]–G[8] are assigned 63 bits each. The 63 bits include 57 data bits and six check bits. This allocation is an optimal allocation of data bits to check bits for a single error correcting Hamming code. In other words, 57 data bits are the maximum number of data bits that may be checked by six check bits. A logical group with 64 bits would require seven check bits for single error correction capability. As discussed above, by optimizing the number of data bits to check bits, the number of check bits may be reduced. There is no requirement for the logical groups to include the same number of bits. In the illustrated embodiment, logical group G[9] includes nine bits. The nine bits include four data bits, four check bits and one global parity (GP) bit.

Table 1 below illustrates one possible assignment of bits to logical groups. Each entry in the table is of the form x-y-z, where x is the data channel number (0 . . . 3), y is the chip number of that channel (0 . . . 15), and z is the pin number of that channel (0 . . . 17). Each column represents the bits assigned to a logical group. For example, the first column indicates the bits assigned to logical group 0 (G[0]), the second column indicates the bits assigned to logical group 1 (G[1]), etc. Each row indicates to which bit position a bit is assigned. For example, bit 3 of logical group 0 (G[0][3]) is stored in device 3 of channel 0 and is transferred on pin 3 of channel 0. Similarly, bit 34 of logical group 7 (G[7][34]) is stored in memory device 3 of data channel 2 and transferred on pin 1 of data channel 2. As is apparent from Table 1, no more than one bit stored in a memory device is assigned to a logical group, and no more than one bit transferred on a pin is assigned to a logical group. It is noted that no more than one bit from a memory device is transferred on a particular pin.

TABLE 1

| | G[0] | G[1] | G[2] | G[3] | G[4] | G[5] | G[6] | G[7] | G[8] | G[9] |
|---|---|---|---|---|---|---|---|---|---|---|
| G[i][0] | 0-0-0 | 0-0-1 | 0-0-2 | 0-0-3 | 0-0-4 | 0-0-5 | 0-0-6 | 0-0-7 | 0-0-8 | 0-1-0 |
| G[i][1] | 0-1-1 | 0-1-2 | 0-1-3 | 0-1-4 | 0-1-5 | 0-1-6 | 0-1-7 | 0-1-8 | 0-2-0 | 0-2-1 |
| G[i][2] | 0-2-2 | 0-2-3 | 0-2-4 | 0-2-5 | 0-2-6 | 0-2-7 | 0-2-8 | 0-3-0 | 0-3-1 | 0-3-2 |
| G[i][3] | 0-3-3 | 0-3-4 | 0-3-5 | 0-3-6 | 0-3-7 | 0-3-8 | 0-4-0 | 0-4-1 | 0-4-2 | 0-4-3 |
| G[i][4] | 0-4-4 | 0-4-5 | 0-4-6 | 0-4-7 | 0-4-8 | 0-5-0 | 0-5-1 | 0-5-2 | 0-5-3 | 0-5-4 |
| G[i][5] | 0-5-5 | 0-5-6 | 0-5-7 | 0-5-8 | 0-6-0 | 0-6-1 | 0-6-2 | 0-6-3 | 0-6-4 | 0-6-5 |
| G[i][6] | 0-6-6 | 0-6-7 | 0-6-8 | 0-7-0 | 0-7-1 | 0-7-2 | 0-7-3 | 0-7-4 | 0-7-5 | 0-7-6 |
| G[i][7] | 0-7-7 | 0-7-8 | 0-8-9 | 0-8-10 | 0-8-11 | 0-8-12 | 0-8-13 | 0-8-14 | 0-8-15 | 0-8-16 |
| G[i][8] | 0-8-17 | 0-9-9 | 0-9-10 | 0-9-11 | 0-9-12 | 0-9-13 | 0-9-14 | 0-9-15 | 0-9-16 | 0-9-17 |
| G[i][9] | 0-10-9 | 0-10-10 | 0-10-11 | 0-10-12 | 0-10-13 | 0-10-14 | 0-10-15 | 0-10-16 | 0-10-17 | |
| G[i][10] | 0-11-10 | 0-11-11 | 0-11-12 | 0-11-13 | 0-11-14 | 0-11-15 | 0-11-16 | 0-11-17 | 0-11-9 | |
| G[i][11] | 0-12-11 | 0-12-12 | 0-12-13 | 0-12-14 | 0-12-15 | 0-12-16 | 0-12-17 | 0-12-9 | 0-12-10 | |
| G[i][12] | 0-13-12 | 0-13-13 | 0-13-14 | 0-13-15 | 0-13-16 | 0-13-17 | 0-13-9 | 0-13-10 | 0-13-10 | |
| G[i][13] | 0-14-13 | 0-14-14 | 0-14-15 | 0-14-16 | 0-14-17 | 0-14-9 | 0-14-10 | 0-14-11 | 0-14-11 | |
| G[i][14] | 0-15-14 | 0-15-15 | 0-15-16 | 0-15-17 | 0-15-9 | 0-15-10 | 0-15-11 | 0-15-12 | 0-15-12 | |
| G[i][15] | 1-0-0 | 1-0-1 | 1-0-2 | 1-0-3 | 1-0-4 | 1-0-5 | 1-0-6 | 1-0-7 | 1-0-8 | |
| G[i][16] | 1-1-1 | 1-1-2 | 1-1-3 | 1-1-4 | 1-1-5 | 1-1-6 | 1-1-7 | 1-1-8 | 1-1-0 | |
| G[i][17] | 1-2-2 | 1-2-3 | 1-2-4 | 1-2-5 | 1-2-6 | 1-2-7 | 1-2-8 | 1-2-0 | 1-2-1 | |
| G[i][18] | 1-3-3 | 1-3-4 | 1-3-5 | 1-3-6 | 1-3-7 | 1-3-8 | 1-3-0 | 1-3-1 | 1-3-2 | |
| G[i][19] | 1-4-4 | 1-4-5 | 1-4-6 | 1-4-7 | 1-4-8 | 1-4-0 | 1-4-1 | 1-4-2 | 1-4-3 | |
| G[i][20] | 1-5-5 | 1-5-6 | 1-5-7 | 1-5-8 | 1-5-0 | 1-5-1 | 1-5-2 | 1-5-3 | 1-5-4 | |
| G[i][21] | 1-6-6 | 1-6-7 | 1-6-8 | 1-6-0 | 1-6-1 | 1-6-2 | 1-6-3 | 1-6-4 | 1-6-5 | |
| G[i][22] | 1-7-7 | 1-7-8 | 1-7-0 | 1-7-1 | 1-7-2 | 1-7-3 | 1-7-4 | 1-7-5 | 1-7-6 | |
| G[i][23] | 1-8-17 | 1-8-9 | 1-8-10 | 1-8-11 | 1-8-12 | 1-8-13 | 1-8-14 | 1-8-15 | 1-8-16 | |
| G[i][24] | 1-9-9 | 1-9-10 | 1-9-11 | 1-9-12 | 1-9-13 | 1-9-14 | 1-9-15 | 1-9-16 | 1-9-17 | |
| G[i][25] | 1-10-10 | 1-10-11 | 1-10-12 | 1-10-13 | 1-10-14 | 1-10-15 | 1-10-16 | 1-10-17 | 1-10-9 | |
| G[i][26] | 1-11-11 | 1-11-12 | 1-11-13 | 1-11-14 | 1-11-15 | 1-11-16 | 1-11-17 | 1-11-9 | 1-11-10 | |
| G[i][27] | 1-12-12 | 1-12-13 | 1-12-14 | 1-12-15 | 1-12-16 | 1-12-17 | 1-12-9 | 1-12-10 | 1-12-11 | |
| G[i][28] | 1-13-13 | 1-13-14 | 1-13-15 | 1-13-16 | 1-13-17 | 1-13-9 | 1-13-10 | 1-13-11 | 1-13-12 | |
| G[i][29] | 1-14-14 | 1-14-15 | 1-14-16 | 1-14-17 | 1-14-9 | 1-14-10 | 1-14-11 | 1-14-12 | 1-14-13 | |
| G[i][30] | 1-15-15 | 1-15-16 | 1-15-17 | 1-15-9 | 1-15-10 | 1-15-11 | 1-15-12 | 1-15-13 | 1-15-14 | |
| G[i][31] | 2-0-0 | 2-0-1 | 2-0-2 | 2-0-3 | 2-0-4 | 2-0-5 | 2-0-6 | 2-0-7 | 2-0-8 | |
| G[i][32] | 2-1-1 | 2-1-2 | 2-1-3 | 2-1-4 | 2-1-5 | 2-1-6 | 2-1-7 | 2-1-8 | 2-1-0 | |
| G[i][33] | 2-2-2 | 2-2-3 | 2-2-4 | 2-2-5 | 2-2-6 | 2-2-7 | 2-2-8 | 2-2-0 | 2-2-1 | |
| G[i][34] | 2-3-3 | 2-3-4 | 2-3-5 | 2-3-6 | 2-3-7 | 2-3-8 | 2-3-0 | 2-3-1 | 2-3-2 | |
| G[i][35] | 2-4-4 | 2-4-5 | 2-4-6 | 2-4-7 | 2-4-8 | 2-4-0 | 2-4-1 | 2-4-2 | 2-4-3 | |
| G[i][36] | 2-5-5 | 2-5-6 | 2-5-7 | 2-5-8 | 2-5-0 | 2-5-1 | 2-5-2 | 2-5-3 | 2-5-4 | |
| G[i][37] | 2-6-6 | 2-6-7 | 2-6-8 | 2-6-0 | 2-6-1 | 2-6-2 | 2-6-3 | 2-6-4 | 2-6-5 | |
| G[i][38] | 2-7-7 | 2-7-8 | 2-7-0 | 2-7-1 | 2-7-2 | 2-7-3 | 2-7-4 | 2-7-5 | 2-7-6 | |
| G[i][39] | 2-8-17 | 2-8-9 | 2-8-10 | 2-8-11 | 2-8-12 | 2-8-13 | 2-8-14 | 2-8-15 | 2-8-16 | |
| G[i][40] | 2-9-9 | 2-9-10 | 2-9-11 | 2-9-12 | 2-9-13 | 2-9-14 | 2-9-15 | 2-9-16 | 2-9-17 | |
| G[i][41] | 2-10-10 | 2-10-11 | 2-10-12 | 2-10-13 | 2-10-14 | 2-10-15 | 2-10-16 | 2-10-17 | 2-10-9 | |
| G[i][42] | 2-11-11 | 2-11-12 | 2-11-13 | 2-11-14 | 2-11-15 | 2-11-16 | 2-11-17 | 2-11-9 | 2-11-10 | |
| G[i][43] | 2-12-12 | 2-12-13 | 2-12-14 | 2-12-15 | 2-12-16 | 2-12-17 | 2-12-9 | 2-12-10 | 2-12-11 | |
| G[i][44] | 2-13-13 | 2-13-14 | 2-13-15 | 2-13-16 | 2-13-17 | 2-13-9 | 2-13-10 | 2-13-11 | 2-13-12 | |
| G[i][45] | 2-14-14 | 2-14-15 | 2-14-16 | 2-14-17 | 2-14-9 | 2-14-10 | 2-14-11 | 2-14-12 | 2-14-13 | |
| G[i][46] | 2-15-15 | 2-15-16 | 2-15-17 | 2-15-9 | 2-15-10 | 2-15-11 | 2-15-12 | 2-15-13 | 2-15-14 | |
| G[i][47] | 3-0-0 | 3-0-1 | 3-0-2 | 3-0-3 | 3-0-4 | 3-0-5 | 3-0-6 | 3-0-7 | 3-0-8 | |
| G[i][48] | 3-1-1 | 3-1-2 | 3-1-3 | 3-1-4 | 3-1-5 | 3-1-6 | 3-1-7 | 3-1-8 | 3-1-0 | |
| G[i][49] | 3-2-2 | 3-2-3 | 3-2-4 | 3-2-5 | 3-2-6 | 3-2-7 | 3-2-8 | 3-2-0 | 3-2-1 | |
| G[i][50] | 3-3-3 | 3-3-4 | 3-3-5 | 3-3-6 | 3-3-7 | 3-3-8 | 3-3-0 | 3-3-1 | 3-3-2 | |
| G[i][51] | 3-4-4 | 3-4-5 | 3-4-6 | 3-4-7 | 3-4-8 | 3-4-0 | 3-4-1 | 3-4-2 | 3-4-3 | |
| G[i][52] | 3-5-5 | 3-5-6 | 3-5-7 | 3-5-8 | 3-5-0 | 3-5-1 | 3-5-2 | 3-5-3 | 3-5-4 | |
| G[i][53] | 3-6-6 | 3-6-7 | 3-6-8 | 3-6-0 | 3-6-1 | 3-6-2 | 3-6-3 | 3-6-4 | 3-6-5 | |
| G[i][54] | 3-7-7 | 3-7-8 | 3-7-0 | 3-7-1 | 3-7-2 | 3-7-3 | 3-7-4 | 3-7-5 | 3-7-6 | |
| G[i][55] | 3-8-17 | 3-8-9 | 3-8-10 | 3-8-11 | 3-8-12 | 3-8-13 | 3-8-14 | 3-8-15 | 3-8-16 | |
| G[i][56] | 3-9-9 | 3-9-10 | 3-9-11 | 3-9-12 | 3-9-13 | 3-9-14 | 3-9-15 | 3-9-16 | 3-9-17 | |
| G[i][57] | 3-10-10 | 3-10-11 | 3-10-12 | 3-10-13 | 3-10-14 | 3-10-15 | 3-10-16 | 3-10-17 | 3-10-9 | |
| G[i][58] | 3-11-11 | 3-11-12 | 3-11-13 | 3-11-14 | 3-11-15 | 3-11-16 | 3-11-17 | 3-11-9 | 3-11-10 | |
| G[i][59] | 3-12-12 | 3-12-13 | 3-12-14 | 3-12-15 | 3-12-16 | 3-12-17 | 3-12-9 | 3-12-10 | 3-12-11 | |
| G[i][60] | 3-13-13 | 3-13-14 | 3-13-15 | 3-13-16 | 3-13-17 | 3-13-9 | 3-13-10 | 3-13-11 | 3-13-12 | |
| G[i][61] | 3-14-14 | 3-14-15 | 3-14-16 | 3-14-17 | 3-14-9 | 3-14-10 | 3-14-11 | 3-14-12 | 3-14-13 | |
| G[i][62] | 3-15-15 | 3-15-16 | 3-15-17 | 3-15-9 | 3-15-10 | 3-15-11 | 3-15-12 | 3-15-13 | 3-15-14 | |

Table 2 below identifies which bits correspond to each check bit and which bits contribute to the global parity bit in logical groups G[0]–G[8]. The check bits for each of these logical groups are computed in the same manner. In other words, the same bits contribute to the respective check bits in each of the first nine logical groups. As discussed above, each of the first nine logical groups includes six check bits (C[i][0]–C[i][5]). Each column heading identifies one bit within the logical group (G[i]). Below the bit position is the name of the bit that occupies that position. For example, bit position 0 (G[i][0]) is occupied by C[i][0]. Likewise bit position 4 (G[i][4]) is occupied by D[i][1]. Each row identifies the bits that contribute to a check bit. For example, each bit that contributes to check bit C[i][5] has a "1" in the bit position corresponding to that bit position in the first row. In particular, C[i][5] is the parity of G[i][32:62] (or, equivalently, the parity of D[i][26:56]). In a more specific example, C[3][5] is the parity of G[3][32:62]. The selection of which bits contribute to each check bit is a conventional application of Hamming codes.

TABLE 2

| G[i]: | 0 0 | 0 1 | 0 2 D | 0 3 | 0 4 D | 0 5 D | 0 6 D | 0 7 | 0 8 D | 0 9 D | 1 0 D | 1 1 D | 1 2 D | 1 3 D | 1 4 | 1 5 D | 1 6 D | 1 7 D |
|---|---|---|---|---|---|---|---|---|---|---|---|---|---|---|---|---|---|---|
| Contents: | C 0 | C 1 | 0 0 | C 2 | 0 1 | 0 2 | 0 3 | C 3 | 0 4 | 0 5 | 0 6 | 0 7 | 0 8 | 0 9 | 1 0 | C 4 | 1 1 | 1 2 |
| C[i][5] | 0 | 0 | 0 | 0 | 0 | 0 | 0 | 0 | 0 | 0 | 0 | 0 | 0 | 0 | 0 | 0 | 0 | 0 |
| C[i][4] | 0 | 0 | 0 | 0 | 0 | 0 | 0 | 0 | 0 | 0 | 0 | 0 | 0 | 0 | 0 | 0 | 1 | 1 |
| C[i][3] | 0 | 0 | 0 | 0 | 0 | 0 | 0 | 1 | 1 | 1 | 1 | 1 | 1 | 1 | 0 | 0 | 0 | 0 |
| C[i][2] | 0 | 0 | 0 | 1 | 1 | 1 | 0 | 0 | 0 | 0 | 1 | 1 | 1 | 1 | 0 | 0 | 0 | 0 |
| C[i][1] | 0 | 0 | 1 | 0 | 0 | 1 | 1 | 0 | 0 | 1 | 1 | 0 | 0 | 1 | 1 | 0 | 0 | 1 |
| C[i][0] | 0 | 0 | 1 | 0 | 1 | 0 | 1 | 0 | 1 | 0 | 1 | 0 | 1 | 0 | 1 | 0 | 1 | 0 |
| P | 0 | 0 | 1 | 0 | 1 | 1 | 0 | 0 | 1 | 1 | 0 | 1 | 0 | 0 | 1 | 0 | 1 | 1 |

| G[i]: | 1 8 D | 1 9 D | 2 0 D | 2 1 D | 2 2 D | 2 3 D | 2 4 D | 2 5 D | 2 6 D | 2 7 D | 2 8 D | 2 9 D | 3 0 | 3 1 D | 3 2 D | 3 3 D | 3 4 D | 3 5 D |
|---|---|---|---|---|---|---|---|---|---|---|---|---|---|---|---|---|---|---|
| Contents: | 1 3 | 1 4 | 1 5 | 1 6 | 1 7 | 1 8 | 1 9 | 2 0 | 2 1 | 2 2 | 2 3 | 2 4 | C 5 | 2 5 | 2 6 | 2 7 | 2 8 | 2 9 |
| C[i][5] | 0 | 0 | 0 | 0 | 0 | 0 | 0 | 0 | 0 | 0 | 0 | 0 | 0 | 1 | 1 | 1 | 1 | 1 |
| C[i][4] | 1 | 1 | 1 | 1 | 1 | 1 | 1 | 1 | 1 | 1 | 1 | 1 | 1 | 0 | 0 | 0 | 0 | 0 |
| C[i][3] | 0 | 0 | 0 | 0 | 0 | 1 | 1 | 1 | 1 | 1 | 1 | 1 | 1 | 0 | 0 | 0 | 0 | 0 |
| C[i][2] | 0 | 1 | 1 | 1 | 1 | 0 | 0 | 0 | 1 | 1 | 1 | 1 | 0 | 0 | 0 | 0 | 0 | 1 |
| C[i][1] | 1 | 0 | 0 | 1 | 1 | 0 | 0 | 1 | 1 | 0 | 0 | 1 | 1 | 0 | 0 | 1 | 0 | 0 |
| C[i][0] | 1 | 0 | 1 | 0 | 1 | 0 | 1 | 0 | 1 | 0 | 1 | 0 | 1 | 0 | 1 | 0 | 1 | 0 |
| P | 0 | 1 | 0 | 0 | 1 | 1 | 0 | 0 | 1 | 0 | 1 | 1 | 0 | 0 | 1 | 1 | 0 | 1 |

| G[i]: | 3 6 D | 3 7 D | 3 8 D | 3 9 D | 4 0 D | 4 1 D | 4 2 D | 4 3 D | 4 4 D | 4 5 D | 4 6 D | 4 7 D | 4 8 D | 4 9 D | 5 0 D | 5 1 D | 5 2 D | 5 3 D |
|---|---|---|---|---|---|---|---|---|---|---|---|---|---|---|---|---|---|---|
| Contents: | 3 0 | 3 1 | 3 2 | 3 3 | 3 4 | 3 5 | 3 6 | 3 7 | 3 8 | 3 9 | 4 0 | 4 1 | 4 2 | 4 3 | 4 4 | 4 5 | 4 6 | 4 7 |
| C[i][5] | 1 | 1 | 1 | 1 | 1 | 1 | 1 | 1 | 1 | 1 | 1 | 1 | 1 | 1 | 1 | 1 | 1 | 1 |
| C[i][4] | 0 | 0 | 0 | 0 | 0 | 0 | 0 | 0 | 0 | 0 | 1 | 1 | 1 | 1 | 1 | 1 | 1 | 1 |
| C[i][3] | 0 | 0 | 0 | 1 | 1 | 1 | 1 | 1 | 1 | 1 | 0 | 0 | 0 | 0 | 0 | 0 | 0 | 0 |
| C[i][2] | 1 | 1 | 1 | 0 | 0 | 0 | 1 | 1 | 1 | 1 | 0 | 0 | 0 | 0 | 1 | 1 | 1 | 1 |
| C[i][1] | 0 | 1 | 1 | 0 | 0 | 1 | 1 | 0 | 0 | 1 | 1 | 0 | 0 | 1 | 1 | 0 | 0 | 1 |
| C[i][0] | 1 | 0 | 1 | 0 | 1 | 0 | 1 | 0 | 1 | 0 | 1 | 0 | 1 | 0 | 1 | 0 | 1 | 0 |
| P | 0 | 0 | 1 | 1 | 0 | 0 | 1 | 0 | 1 | 0 | 1 | 0 | 0 | 1 | 0 | 1 | 1 | 1 |

| G[i]: | 5 4 D | 5 5 D | 5 6 D | 5 7 D | 5 8 D | 5 9 D | 6 0 D | 6 1 D | 6 2 D |
|---|---|---|---|---|---|---|---|---|---|
| Contents: | 4 8 | 4 9 | 5 0 | 5 1 | 5 2 | 5 3 | 5 4 | 5 5 | 5 6 |
| C[i][5] | 1 | 1 | 1 | 1 | 1 | 1 | 1 | 1 | 1 |
| C[i][4] | 1 | 1 | 1 | 1 | 1 | 1 | 1 | 1 | 1 |
| C[i][3] | 0 | 1 | 1 | 1 | 1 | 1 | 1 | 1 | 1 |
| C[i][2] | 1 | 0 | 0 | 0 | 0 | 1 | 1 | 1 | 1 |
| C[i][1] | 1 | 0 | 0 | 1 | 1 | 0 | 0 | 1 | 1 |
| C[i][0] | 1 | 0 | 1 | 0 | 1 | 0 | 1 | 0 | 1 |
| P | 0 | 0 | 1 | 1 | 0 | 1 | 0 | 0 | 1 |

The last row in Table 2 identifies which bits from logical groups G[0]–G[8] contribute to the global parity bit. It is noted that the global parity bit is logically the parity of all the bits in the data block. However, the circuitry required to generate the global parity bit may be reduced by logically replacing each check bit by the data bits it covers and eliminating bits that contribute to the parity bit an even number of times. If a bit affects an odd number of check bits, then the bit contributes to the parity bit an even number of times, and changing the state of the data bit will not effect the global parity bit. For example, D[i][3] affects check bits C[i][0:2]. Accordingly, if the state of D[i][3] changes state, it and three check bits will change state. The change of state affects an even number of bits within the global parity, which means that changing the state of the bit will not effect the global parity bit.

Table 3 identifies which bits in logical group G[9] contribute to the check bits of that logical group. The last row of Table 3 identifies which bits of logical group G[9] contribute to the global parity bit. As noted above, the global parity bit is logically of all the data bits in the data block. However, circuitry may be reduced by eliminating bits which contribute to the parity bit an even number of times.

TABLE 3

| G[9]: | 0 0 | 0 1 | 0 2 D | 0 3 | 0 4 D | 0 5 D | 0 6 D | 0 7 | 0 8 D |
|---|---|---|---|---|---|---|---|---|---|
| Contents: | C 0 | C 1 | P | C 2 | 0 0 | 0 1 | 0 2 | C 3 | 0 3 |
| C[9][3] | 0 | 0 | 0 | 0 | 0 | 0 | 0 | 0 | 1 |
| C[9][2] | 0 | 0 | 0 | 0 | 1 | 1 | 1 | 0 | 0 |
| C[9][1] | 0 | 0 | 1 | 0 | 0 | 1 | 1 | 0 | 0 |
| C[9][0] | 0 | 0 | 1 | 0 | 1 | 0 | 1 | 0 | 1 |

TABLE 3-continued

|  | 0 | 0 | 0 | 0 | 0 | 0 | 0 | 0 | 0 |
|---|---|---|---|---|---|---|---|---|---|
| G[9]: | 0 | 1 | 2 | 3 | 4D | 5D | 6D | 7 | 8D |
| Contents: | C0 | C1 | P | C2 | 00 | 01 | 02 | C3 | 03 |
| C[9][3] | 0 | 0 | 0 | 0 | 0 | 0 | 0 | 0 | 1 |
| P | 0 | 0 | 0 | 0 | 1 | 1 | 0 | 0 | 1 |

It is noted that a circularity may exist in calculating the global parity bit. Namely, the global parity bit effects the check bits, which in turn contribute to the global parity bit. The circularity may be eliminated by having the global parity bit contribute to an even number of check bits. The check bits are generated based on an assumed global parity bit. The global parity bit is then generated based on the check bits. The check bits effected by the global parity bits are then re-generated based on the global parity bit. Because the global parity bit effects an even number of check bits, the contribution of the check bits to the global parity bit will not be changed when the check bits are regenerated. The simplification shown in Tables 2 and 3 also eliminates the circularity. In this simplification, none of the check bits contribute to the global parity bit.

Generally speaking, error correction circuit 1008 receives 517 data bits. Error correction circuit 1008 generates the 59 check bits including the global parity bit in accordance with Tables 2 and 3 above. Error correction circuit 1008 provides the 517 data bits and 59 check bits to data channels 1002. The data bits and check bits are stored until a read request is received. When a read request is received, the data are read from data channels 1002 and the data bits and check bits are provided to error correction circuit 1008. Error correction circuit 1008 verifies the accuracy of the data based on the check bits. In the illustrated embodiment, if a single error or a component failure is detected, the errors are corrected and the 517 data bits are provided to the system. Alternatively, if uncorrectable multiple errors are detected, error correction circuit 1008 outputs an uncorrectable error signal to the system. The system may output an uncorrectable error signal to a user or may attempt to re-read the data from memory.

Tables 4 and 5 below illustrate which bits contribute to the syndrome bits for each logical group. Generally speaking, the syndrome bits are the parity of the bits that contribute to the check bit and the check bit itself. For example, syndrome bit S[i][5] is the parity of D[i][26:56] and C[i][5]. Table 4 shows the bits that contribute to the syndrome bits for logical groups G[0]–G[8]. Table 5 shows the bits that contribute to the syndrome bits of logical group G[9]. In addition to the syndromes, Q is calculated by generating the parity of all 576 bits received by error correction circuit 1008.

TABLE 4

| G [i] | 0 0 | 0 1 | 0 2D | 0 3 | 0 4DD | 0 5DD | 0 6DD | 0 7 | 0 8DD | 0 9DD | 1 0DD | 1 1DD | 1 2DD | 1 3DD | 1 4DD | 1 5 | 1 6DD | 1 7DD | 1 8DD | 1 9DD | 2 0D |
|---|---|---|---|---|---|---|---|---|---|---|---|---|---|---|---|---|---|---|---|---|---|
| Contents: | C0 | C1 | 00 | C2 | 01 | 02 | 03 | C3 | 04 | 05 | 06 | 07 | 08 | 09 | 10 | C4 | 11 | 12 | 13 | 14 | 15 |
| S[i][5] | 0 | 0 | 0 | 0 | 0 | 0 | 0 | 0 | 0 | 0 | 0 | 0 | 0 | 0 | 0 | 0 | 0 | 0 | 0 | 0 | 0 |
| S[i][4] | 0 | 0 | 0 | 0 | 0 | 0 | 0 | 0 | 0 | 0 | 0 | 0 | 0 | 0 | 1 | 1 | 1 | 1 | 1 | 1 | 1 |
| S[i][3] | 0 | 0 | 0 | 0 | 0 | 0 | 0 | 1 | 1 | 1 | 1 | 1 | 1 | 1 | 0 | 0 | 0 | 0 | 0 | 0 | 0 |
| S[i][2] | 0 | 0 | 0 | 1 | 1 | 1 | 1 | 0 | 0 | 0 | 0 | 1 | 1 | 1 | 0 | 0 | 0 | 0 | 0 | 1 | 1 |
| S[i][1] | 0 | 1 | 1 | 0 | 0 | 1 | 1 | 0 | 0 | 1 | 1 | 0 | 0 | 1 | 1 | 0 | 0 | 1 | 1 | 0 | 0 |
| S[i][0] | 1 | 0 | 1 | 0 | 1 | 0 | 1 | 0 | 1 | 0 | 1 | 0 | 1 | 0 | 1 | 0 | 1 | 0 | 1 | 0 | 1 |

| Gi[i] | 2 1DD | 2 2DD | 2 3DD | 2 4DD | 2 5DD | 2 6DD | 2 7DD | 2 8DD | 2 9DD | 3 0 | 3 1DD | 3 2DD | 3 3DD | 3 4DD | 3 5DD | 3 6DD | 3 7DD | 3 8DD | 3 9DD | 4 0DD | 4 1DD |
|---|---|---|---|---|---|---|---|---|---|---|---|---|---|---|---|---|---|---|---|---|---|
| Contents: | 16 | 17 | 18 | 19 | 20 | 21 | 22 | 23 | 24 | C5 | 25 | 26 | 27 | 28 | 29 | 30 | 31 | 32 | 33 | 34 | 35 |
| S[i][5] | 0 | 0 | 0 | 0 | 0 | 0 | 0 | 0 | 0 | 1 | 1 | 1 | 1 | 1 | 1 | 1 | 1 | 1 | 1 | 1 | 1 |
| S[i][4] | 1 | 1 | 1 | 1 | 1 | 1 | 1 | 1 | 1 | 0 | 0 | 0 | 0 | 0 | 0 | 0 | 0 | 0 | 0 | 0 | 0 |
| S[i][3] | 0 | 0 | 1 | 1 | 1 | 1 | 1 | 1 | 1 | 0 | 0 | 0 | 0 | 0 | 0 | 0 | 0 | 0 | 1 | 1 | 1 |
| S[i][2] | 1 | 1 | 0 | 0 | 0 | 0 | 1 | 1 | 1 | 0 | 0 | 0 | 0 | 1 | 1 | 1 | 1 | 0 | 0 | 0 | 0 |
| S[i][1] | 1 | 1 | 0 | 0 | 1 | 1 | 0 | 0 | 1 | 0 | 0 | 1 | 1 | 0 | 0 | 1 | 1 | 0 | 0 | 0 | 1 |
| S[i][0] | 0 | 1 | 0 | 1 | 0 | 1 | 0 | 1 | 0 | 1 | 0 | 1 | 0 | 1 | 0 | 1 | 0 | 1 | 0 | 1 | 0 |

| Gi[i] | 4 2DD | 4 3DD | 4 4DD | 4 5DD | 4 6DD | 4 7DD | 4 8DD | 4 9DD | 5 0DD | 5 1DD | 5 2DD | 5 3DD | 5 4DD | 5 5DD | 5 6DD | 5 7DD | 5 8DD | 5 9DD | 6 0DD | 6 1DD | 6 2DD |
|---|---|---|---|---|---|---|---|---|---|---|---|---|---|---|---|---|---|---|---|---|---|
| Contents: | 36 | 37 | 38 | 39 | 40 | 41 | 42 | 43 | 44 | 45 | 46 | 47 | 48 | 49 | 50 | 51 | 52 | 53 | 54 | 55 | 56 |
| S[i][5] | 1 | 1 | 1 | 1 | 1 | 1 | 1 | 1 | 1 | 1 | 1 | 1 | 1 | 1 | 1 | 1 | 1 | 1 | 1 | 1 | 1 |
| S[i][4] | 0 | 0 | 0 | 0 | 0 | 1 | 1 | 1 | 1 | 1 | 1 | 1 | 1 | 1 | 1 | 1 | 1 | 1 | 1 | 1 | 1 |
| S[i][3] | 1 | 1 | 1 | 1 | 1 | 0 | 0 | 0 | 0 | 0 | 0 | 0 | 0 | 1 | 1 | 1 | 1 | 1 | 1 | 1 | 1 |
| S[i][2] | 0 | 1 | 1 | 1 | 1 | 0 | 0 | 0 | 0 | 1 | 1 | 1 | 1 | 0 | 0 | 0 | 0 | 1 | 1 | 1 | 1 |
| S[i][1] | 1 | 0 | 0 | 1 | 1 | 0 | 0 | 1 | 1 | 0 | 0 | 1 | 1 | 0 | 0 | 1 | 1 | 0 | 0 | 1 | 1 |
| S[i][0] | 1 | 0 | 1 | 0 | 1 | 0 | 1 | 0 | 1 | 0 | 1 | 0 | 1 | 0 | 1 | 0 | 1 | 0 | 1 | 0 | 1 |

TABLE 5

| G[9] | 00 | 01 | 02 | 03 | 04 | 05 | 06 | 07 | 08 |
|---|---|---|---|---|---|---|---|---|---|
| Contents: | C0 | C1 | P | C2 | D0 | D1 | D2 | C3 | D3 |
| S[9][3] | 0 | 0 | 0 | 0 | 0 | 0 | 0 | 1 | 1 |
| S[9][2] | 0 | 0 | 0 | 1 | 1 | 1 | 1 | 0 | 0 |
| S[9][1] | 0 | 1 | 1 | 0 | 0 | 1 | 1 | 0 | 0 |
| S[9][0] | 1 | 0 | 1 | 0 | 1 | 0 | 1 | 0 | 1 |

Generally speaking, if no errors are detected in a logical group, the syndrome bits in each logical group will all be unasserted. If one error occurs, the syndrome bits to which that data bit contributes will be asserted. For example, if D[i][3] changes state, then syndromes S[i][2:0] will be asserted. Accordingly, the syndrome bits of a logical group may be used to detect which data bit is erroneous. Assume syndrome S[i][5:0] is "000111". Because the set of syndromes to which a data bit contributes is unique, if only one error has occurred, this syndrome indicates that data bit D[i][3] is erroneous. If two errors have occurred within a logical group, however, the syndrome may give a false indication of the erroneous bits. For example, if C[i][0] and D[i][2] change state, the same syndrome ("000111") would be attained. As discussed above in reference to FIGS. 6 and 7, the global parity bit may be used in conjunction with the syndromes to detect double bit errors.

Figure 11:
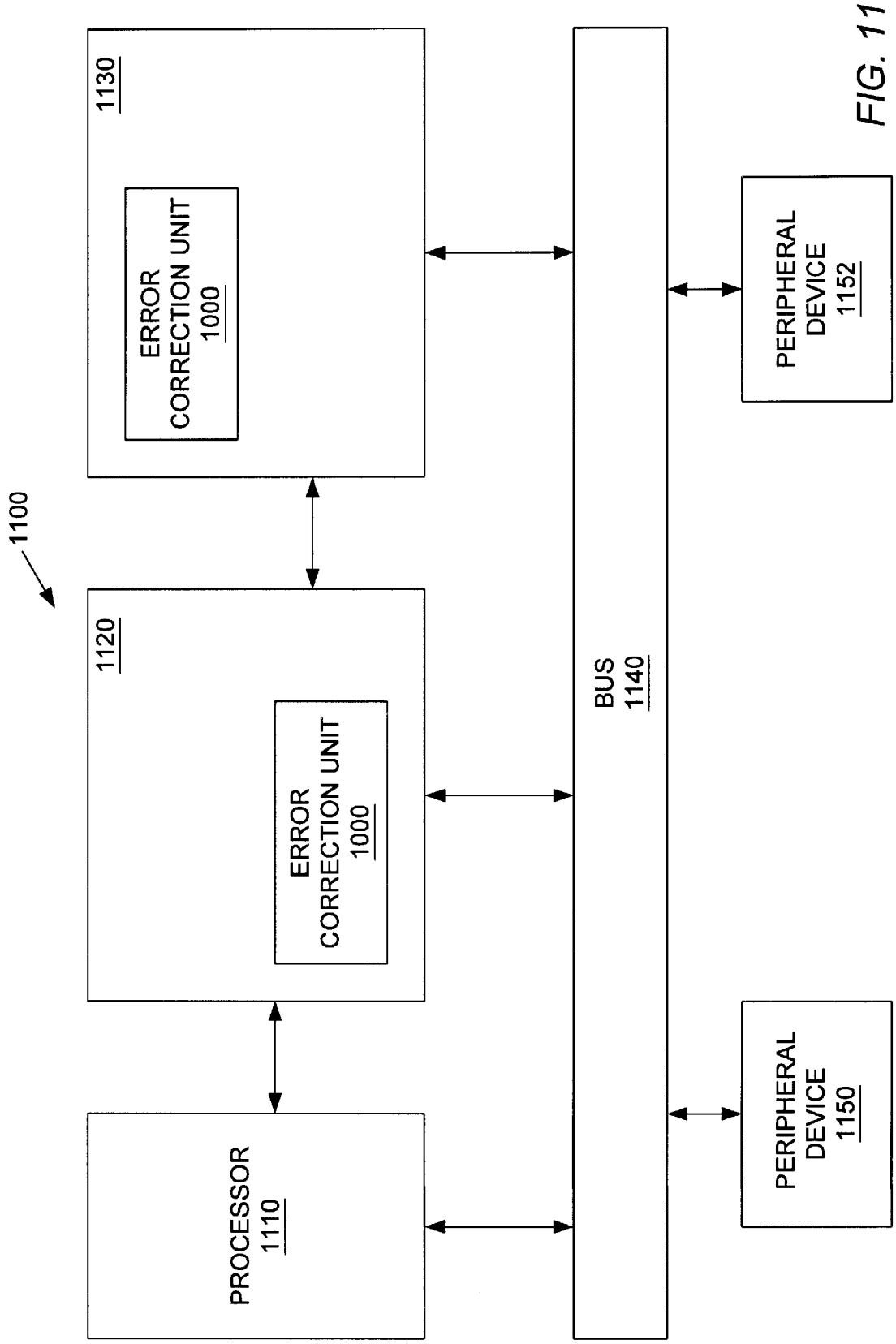
FIG. 11 is a block diagram of a computer system that allocates bits of a data block into a plurality of logical groups according to an embodiment of the present invention.

Turning now to FIG. 11, a block diagram of a computer system that corrects memory part failure is shown. System 1100 may be a computer system, an industrial system, or any other system that may employ a memory to store data, a bus upon which data are moved, and a processor or controller to control the movement of the data. For simplicity, system 1100 includes a processor 1110, a cache 1120, a memory 1130, a bus 1140 and a plurality of peripheral devices 1150–1152. It should be noted that computer system 1100 is only shown as an example and many other configurations are contemplated. As shown and for simplicity, a memory system 1000 is included in the memory 1130 and the cache 1120 to facilitate single error correction and double error detection for data stored in system 1100. It should be also noted that the cache 1120 may be included within processor 1110. Many other configurations are also possible as to the arrangement and additional components that may be included in system 1100. For example, bus 1140 is shown as a system bus for simplicity, however, computer system 1100 may include other buses. Further, different embodiments of the memory system 1000 may be adapted in any component that may be included within system 1100, for example, the cache or the bus where data movement or storage is needed.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A memory system comprising:
    a plurality of first components configured to store a data block, wherein said data block includes a plurality of data bits and a plurality of check bits, and wherein each bit of said data block is assigned to one of said plurality of first components;
    a plurality of second components configured to transfer the bits of said data block, wherein each bit of said data block is assigned to one of said plurality of second components; and
    an error detection circuit coupled to said first components and said second components, wherein said error detection circuit is configured to:
        generate one or more check bits of a given one of said logical groups from data bits of the given one of said logical groups;
        verify the accuracy of the data bits of the given one of the said logical groups using the check bits of the given one of said logical groups;
    wherein said data bits and said check bits are grouped to form a plurality of logical groups, and wherein said logical group includes at most one bit assigned to a given one of said plurality of first components and at most one bit assigned to a given one of said plurality of second components; and
    wherein a number of said logical groups is selected to be greater than a number of bits of said data block stored in each of said plurality of first components.

2. The memory system as recited in claim 1, wherein said plurality of first components is a plurality of memory devices and said plurality of second components is a plurality of pins.

3. The memory system as recited in claim 1, wherein numbers of bits in each of said logical groups are selected to be less than the number of said first components.

4. The memory system as recited in claim 1, wherein said error detection circuit implements a Hamming Code, and wherein said error detection circuit is configured to correct errors detected in said data block.

5. A system comprising:
    a processor;
    a bus;
    a memory system coupled to said processor and said bus, comprising:
        a plurality of first components is configured to store a data block, wherein said data block includes a plurality of data bits and a plurality of check bits, and wherein each bit of said data block is assigned to one of said plurality of first components;
        a plurality of second components configured to transfer bits of said data block, wherein each bit of said data block is assigned to one of said plurality of second components; and
        an error detection circuit coupled to said first components and said second components, wherein said error detection circuit is configured to:
            generate one or more check bits of a given one of said logical groups from data bits of the given one of said logical groups;
            verify the accuracy of the data bits of the given one of the said logical groups using the check bits of the given one of said logical groups;
        wherein said data bits and said check bits are grouped to form a plurality of logical groups, and wherein said logical group includes at most one bit assigned to a given one of said plurality of first components and at most one bit assigned to a given one of said plurality of second components; and
        wherein a number of said logical groups is selected to be greater than a number of bits of said data block stored in each of said plurality of first components.

6. The system as recited in claim 5, wherein said plurality of first components is a plurality of memory devices and said plurality of second components is a plurality of pins.

7. The system as recited in claim 5, wherein number of bits in each of said logical groups are selected to be less than a number of first components in said plurality of first components.

8. The system as recited in claim 5, wherein said error detection circuit implements a Hamming Code, and wherein said error detection circuit is configured to correct errors detected in said data block.

9. A method of detecting errors in a data block of a computer system that includes a plurality of components, said method comprising:
- assigning a plurality of bits of said data block to a plurality of logical groups such that each of said logical groups includes at most one bit corresponding to a given one of said plurality components, wherein said plurality of bits of said data block includes a plurality of data bits and a plurality of check bits; and
- performing error correction on bits within each logical group of said plurality of logical groups, wherein said error correction is performed upon detection of at least one error in said bits,
- selecting number of bits in each of said logical groups to be less than a number of said components in said plurality components.

10. The method as recited in claim 9, wherein said number of bits in each of said logical groups of said plurality of logical groups is selected to optimize a ratio of the number of check bits to the number of data bits.

11. The method as recited in claim 10, further comprising selecting a number of said logical groups to be greater than a number of bits of said data block stored in each of said plurality of first components.

12. The method as recited in claim 11, wherein said plurality of components is a plurality of memory devices.

13. The method as recited in claim 12, wherein at most one bit stored in a given one of said plurality of memory devices is assigned to any one of said logical group such that a failure in the given one of said plurality of memory devices causes at most one bit error in any one of said plurality of logical groups.

14. The method as recited in claim 11, wherein said plurality of components is a plurality of pins for transferring a plurality of bits of said data block.

15. The method as recited in claim 14, wherein at most one bit transferred by a given one of said pins is assigned to any one of said logical groups such that a failure of the given one of said pins causes at most one bit error in any one of said plurality of logical groups.

16. The method as recited in claim 9, wherein said detection of said at least one error is performed using a Hamming Code and wherein said error correction is performed using error correcting Hamming Codes.

17. A method of detecting errors in a data block of a computer system that includes a plurality of first components and a plurality of second components wherein bits of said data block correspond to a first component and a second component, said method comprising:
- assigning said bits of said data block to a plurality of logical groups such that at most one bit corresponding to a given one of said plurality of first components is assigned to a first logical group of said plurality of logical groups and at most one bit corresponding to a given one of said plurality of second components is assigned to said first logical group;
- performing error detection on bits within said first logical group, wherein said first logical group includes a plurality of data bits and a plurality of check bits; and
- selecting a number of bits in said first logical group to be less than a number of said components in said plurality of first components.

18. The method as recited in claim 17 further comprising selecting a number of bits in said first logical to decrease a number of check bits in said data block.

19. The method as recited in claim 18 further comprising selecting a number of said logical groups to be greater than a number of bits of said data block stored in each of said plurality of first components.

20. The method as recited in claim 19, wherein said plurality of first components are memory devices configured to store at least a portion of bits of said data block and said plurality of second components are pins configured to transfer said bits of said data block.

21. The method as recited in claim 20, wherein at most one bit stored in a given one of said memory devices is assigned to said first logical group and at most one bit transferred by a given one said pins is assigned to said first logical group such that a failure of the given one of said memory devices causes at most one bit error in said first logical group and a failure of the given one of said pins causes at most one bit error in said first logical group.

22. The method as recited in claim 17, wherein said error detection is performed using a Hamming Code, and wherein said method further comprises performing error correction on a bit within said first logical group.

23. An apparatus for detecting errors in a data block of a computer system including a plurality of components, said apparatus comprising:
- means for assigning a plurality of bits of said data block to a plurality of logical groups such that at most one bit of said plurality of bits corresponding to a given one of said components is assigned to any given one of said logical groups, wherein said plurality of bits of said data block includes a plurality of data bits and a plurality of check bits; and
- means for performing error correction on bits within each of said logical groups, wherein said error correction is performed upon detection of at least one error in said bits;
- wherein a number of bits in any given one of said logical group is selected to be less than a number of said components in said plurality of components.

24. The apparatus as recited in claim 23, wherein said number of bits in any given one of said logical groups is selected to decrease a number of said check bits in said data block.

25. The apparatus as recited in claim 24, wherein a number of said logical groups is greater than a number of bits of said block stored in each plurality of components.

26. The apparatus as recited in claim 25, wherein said plurality of components is a plurality of memory devices.

27. The apparatus as recited in claim 26, wherein at most one bit stored in a given one of said memory devices is assigned to any one of said logical groups such that a failure in the given one of said memory devices causes at most one bit error in any of said plurality of logical groups.

28. The apparatus as recited in claim 25, wherein said plurality of components is a plurality of pins for transferring a plurality of bits of said data block.

29. The apparatus as recited in claim 28, wherein at most one bit transferred by a given one of said pins is assigned to one of said plurality of logical such that a failure of the given one of said pins causes at most one bit error in any one of said plurality of logical groups.

30. The apparatus as recited in claim 23, wherein said detection of said at least one error is performed using a Hamming Code and wherein said error correction is performed using error correcting Hamming Codes.

* * * * *

UNITED STATES PATENT AND TRADEMARK OFFICE
CERTIFICATE OF CORRECTION

PATENT NO. : 6,477,682 B2 Page 1 of 1
DATED : November 5, 2002
INVENTOR(S) : Robert Cypher It is certified that error appears in the above-identified patent and that said Letters Patent is hereby corrected as shown below:

Column 18,
Line 10, please delete "the" before "said".
Line 13, please delete "said" after "wherein".
Line 35, please delete "is" after "components".
Line 40, please insert -- the -- after "transfer".
Line 55, please replace "said" with -- each --.
Line 64, please replace "number" with -- numbers --.

Column 19,
Lines 11 and 20, please insert -- of -- after "plurality".
Line 21, please replace "number" with -- numbers --.
Line 32, please replace -- group -- with "groups".
Line 66, please insert -- group -- after "logical".

Column 20,
Line 46, please insert -- of said -- after "each".

Signed and Sealed this

Fifteenth Day of April, 2003

JAMES E. ROGAN
*Director of the United States Patent and Trademark Office*